(12) United States Patent
Jacobs et al.

(10) Patent No.: US 6,667,592 B2
(45) Date of Patent: Dec. 23, 2003

(54) MAPPED ROBOT SYSTEM

(75) Inventors: Stephen Jacobs, Chesterfield, VA (US); James E. Goodnow, II, Grass Valley, CA (US); David Knuth, Richmond, VA (US); Charles W. Ward, Midlothian, VA (US); Allen Bancroft, Midlothian, VA (US)

(73) Assignee: Intellibot, L.L.C., Richmond, VA (US)

( * ) Notice: Subject to any disclaimer, the term of this patent is extended or adjusted under 35 U.S.C. 154(b) by 0 days.

(21) Appl. No.: 09/928,669

(22) Filed: Aug. 13, 2001

(65) Prior Publication Data

US 2003/0030398 A1 Feb. 13, 2003

(51) Int. Cl.[7] .................................................. B25J 5/00
(52) U.S. Cl. .................. 318/568.12; 318/580; 318/587; 318/568.16; 318/568.11
(58) Field of Search .............................. 901/1; 318/580, 318/587, 568.12, 568.16, 568.11; 701/24; 700/245, 247

(56) References Cited

U.S. PATENT DOCUMENTS

| | | | |
|---|---|---|---|
| 5,309,592 A | 5/1994 | Hiratsuka | |
| 5,363,305 A | 11/1994 | Cox et al. | |
| 5,711,388 A * | 1/1998 | Davies et al. | 180/168 |
| 5,896,488 A * | 4/1999 | Jeong | 700/255 |
| 5,911,767 A | 6/1999 | Garibotto et al. | |
| 5,995,884 A * | 11/1999 | Allen et al. | 701/24 |
| 6,108,597 A | 8/2000 | Kirchner et al. | |
| 6,246,931 B1 * | 6/2001 | Shinogi | 701/24 |
| 6,459,955 B1 * | 10/2002 | Bartsch et al. | 700/245 |

\* cited by examiner

*Primary Examiner*—Karen Masih
(74) *Attorney, Agent, or Firm*—Hunton & Williams

(57) ABSTRACT

A method of utilizing a robot system is provided comprising the steps of commanding the robot system to perform a function in an area, the area having an area layout including at least one area segment. The method further includes accessing by the robot system a stored map of the area layout, the stored map having at least one function task associated with the at least one area segment, localizing a first position of the robot system in the area, determining a function path from the first position of the robot system for navigation of the area and completion of the at least one function task, repeatedly continuously localizing a current position of the robot system while navigating the robot system along the function path, and completing the at least one function task that is associated with the current position of the robot system.

38 Claims, 19 Drawing Sheets

MAPPED ROBOT SYSTEM

FIELD OF THE INVENTION

The system and methods of the invention relate to utilizing a robot system to perform a function. More specifically, the invention relates to a service robot system and a method of utilizing a service robot system to perform a service function in an area.

BACKGROUND OF THE INVENTION

In all facets of today's society, people are relying on computers and robots to accomplish more on a day to day basis. Many industrial processes that, in the past, required a human worker to staff are now being done by robots controlled by computers. For example, the automotive industry relies heavily on robots in its automated manufacturing processes. With the reliance on computers and robots to perform simple functions, like cleaning or manufacturing, increasing everyday, there is a need to make controlling these systems easier and more efficient. Therefore, a computer or robot could operate efficiently and effectively with as little human direction as possible.

This need for efficient and effective mechanisms for controlling computer and robot systems can be seen in several industries. The industrial cleaning industry provides one example. Every night, throughout the country, thousands of janitors and cleaning people enter the buildings, plants, airports, hotels, restaurants, for example, to clean these indoor spaces. Many of the cleaning functions provided by these personnel could also be done by an autonomous robot system if there was an efficient and effective method of controlling it. As a result, many corporations, businesses and retailers could save precious business expenses if a robot system could perform the same function.

Furthermore, it would be desirable to have a robot system that could operate for extended periods of time autonomously, without the need for extended human supervision. In this respect, a robot system could perform a series of tasks that free the robot system operator to perform other duties. This need can, once again, be seen in the industrial cleaning industry. For example, illustrative cleaning systems will autonomously clean an area, but then require an operator to move the system to the next area that requires service. This may require transport over areas that do not require any type of cleaning or other service. Thus, there is a need for a method of controlling a cleaning robot system such that the system can be given multiple tasks, in many different areas, wherein the robot system could finish the tasks in each different area without a human operator being required.

Accordingly, there is a need for an efficient and effective system and method for addressing these problems and others with respect to the utilization of robot systems and cleaning robot systems.

BRIEF SUMMARY OF THE INVENTION

In accordance with one embodiment, the invention provides a method of utilizing a robot system, the method comprising the steps of commanding the robot system to perform a function in an area, the area having an area layout including at least one area segment. The method further includes accessing by the robot system a stored map of the area layout, the stored map having at least one function task associated with the at least one area segment, localizing a first position of the robot system in the area, and determining a function path from the first position of the robot system for navigation of the area and completion of the at least one function task. Lastly, the method includes repeatedly continuously localizing a current position of the robot system while navigating the robot system along the function path, and completing the at least one function task that is associated with the current position of the robot system on the stored map of the area, for example.

In accordance with another embodiment, the invention provides a method of utilizing a cleaning robot to perform a cleaning function, the cleaning function having at least one cleaning function task, the method comprising the steps of commanding the cleaning robot system to perform the cleaning function in an area, the area having an area layout including at least one area segment. The method further includes accessing by the cleaning robot system a stored map of the area layout, the stored map having at least one cleaning function task associated with the at least one area segment, localizing a first position of the cleaning robot system in the area, and determining a cleaning function path from the first position of the cleaning robot system for navigation of the area and completion of the at least one cleaning function task. Lastly, the method includes repeatedly continuously localizing a current position of the cleaning robot system while navigating the cleaning robot system along the cleaning function path, and completing the at least one cleaning function task that is associated with the current position of the cleaning robot system on the stored map of the area, for example.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

Figure 1:
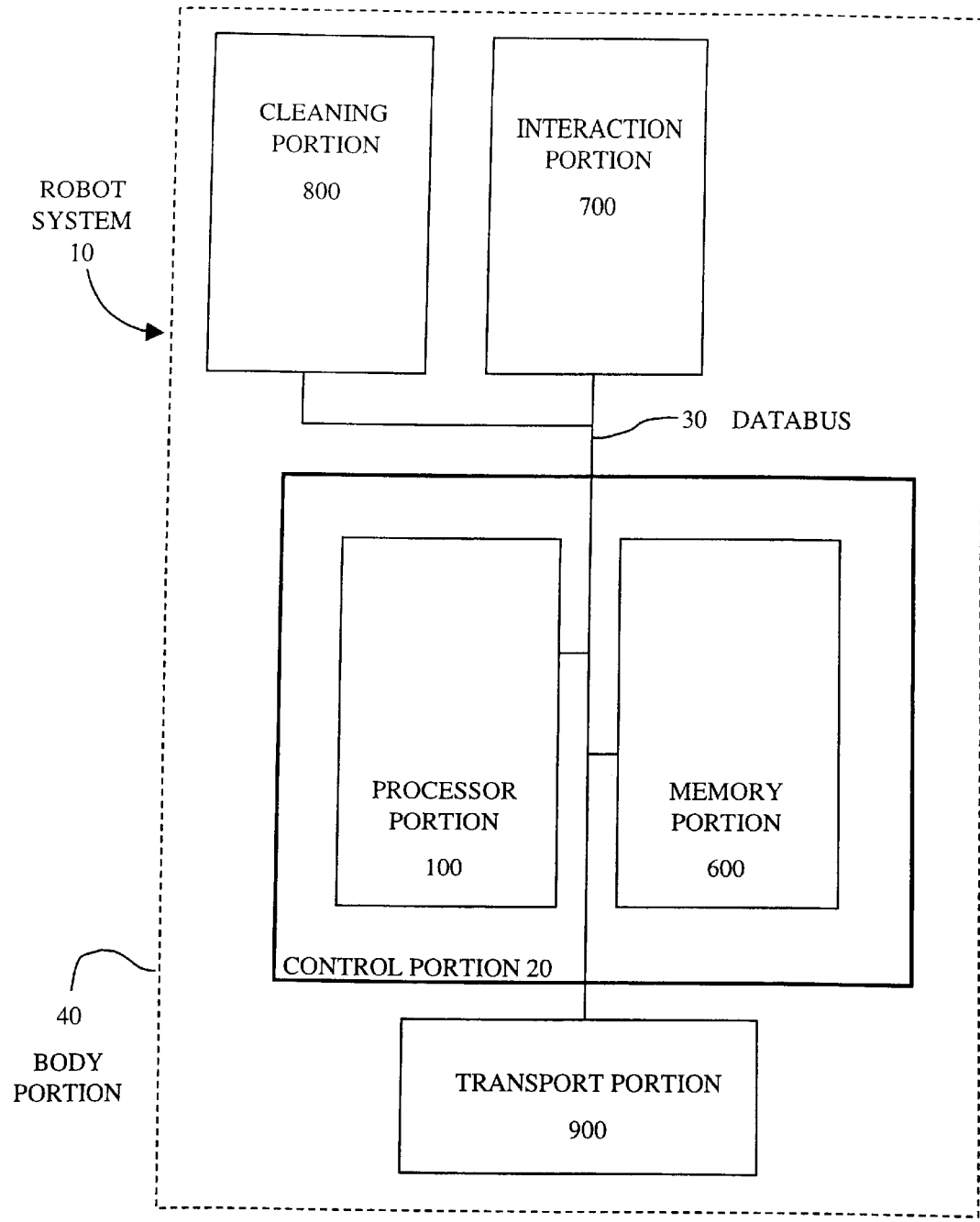
FIG. 1 is a block diagram showing a robot system in accordance with one embodiment of the system and method of the invention.

In accordance with one embodiment, the invention provides a method of utilizing a robot system, the method comprising the steps of commanding the robot system to perform a function in an area, the area having an area layout including at least one area segment. The method further includes accessing by the robot system a stored map of the area layout, the stored map having at least one function task associated with the at least one area segment, localizing a first position of the robot system in the area, and determining a function path from the first position of the robot system for navigation of the area and completion of the at least one function task. Lastly, the method includes repeatedly continuously localizing a current position of the robot system while navigating the robot system along the function path, and completing the at least one function task that is associated with the current position of the robot system on the stored map of the area, for example.

Further details of the systems and methods of the invention will hereinafter be described. As used herein, items referred to in the singular may also be in the plural, and items referred to in the plural may also be in the singular.

As used herein, a "robot" or "robot system" or "cleaning robot system" is a stand-alone system, for example, that is mobile, that performs both physical activities and computational activities. The physical activities may be performed using a wide variety of movable parts including cleaning devices and tools, for example. The computational activities may be performed utilizing a suitable processor and memory stores, i.e., a data memory storage device, for example. The computational activities may include processing information input from various sensors or other inputs of the robot system to perform commanded functions; processing the input information, as well as other data in the memory stores of the robot system, to generate a variety of desired information; or outputting information that has been acquired or produced by the robot system to a desired destination, for example.

As used herein, the term "area" is a distinct part or section of an environment, surroundings or space, that is set aside from other parts or sections, for example. An area may include, but not be limited to, a part or section of a store, factory, warehouse, shop, mall, fair, outside market, display area, hospital, law firm, accounting firm, restaurant, commercial office space, convention center, hotel, airport, arena, stadium, outdoor venue or any other space either inside a structure or outside in which boundaries may be provided for the surroundings, for example. An area may describe a two dimensional plot or three dimensional space, for example. Accordingly, an area could be mapped utilizing coordinates in the X and Y axis, or using coordinates in the X, Y and Z axis.

As used herein, the term "area layout" is an arrangement, plan, or structuring of an area, for example. An area layout may define the walls of a structure, different zones within a building, or other structural features of an area, for example. As used herein, the term "area segment" is any portion, part or section of an area layout that can be divided or subdivided. Therefore, an area segment could include a hallway, doorway, staircase, or other section of an area layout, for example. It should be appreciated that an area segment does not have to be separated from other area segments by physical boundaries, need not be contiguous, may overlap other area segments. In general, an area segment can be defined in any suitable manner, as desired by an operator, for the performance of commanded tasks.

As used herein, the term "function" describes any assigned duty, activity, service, assignment or role, that an operator commands a robot system to perform. For example, the robot system may be commanded to perform a cleaning function, security function, entertainment function, or other services. In addition, as used herein, the term "function task" describes a piece of work assigned or done as part of a robot system's function. It should be appreciated that in order to perform its function, a robot system must complete at least one function task associated with the function.

As used above and herein, the term "cleaning function" describes any function associated with cleaning of an area. For example, a cleaning function may include, but not be limited to, rinsing, wringing, flushing, wiping, mopping, dust mopping, sponging, scouring, abrading, grinding, leveling, swabbing, scrubbing, scraping, stripping, sanding, brushing, washing, drying, laving, laundering, applying detergent to, applying abrasive to, clearing, disinfecting, irradiating, deodorizing, whitewashing, fumigating, applying anti-microbial agents to, sweeping, vacuuming, soaking, removing stains and soil marks from, waxing, buffing, utilizing a squeegee device on, applying cleaning solution to, dusting, bleaching, or shampooing a portion of an area.

Illustratively, an operator may develop a cleaning function, entitled "basic clean," in which the robot system is programmed to sweep the floor of an area. This "basic clean" function would include two function tasks, in which the robot system would (1) navigate the area it is sweeping and (2) perform the sweeping.

In another example, an operator may associate a function with an area, such that when the robot system receives the command to perform the function, the function is associated with a known area. Illustratively, the operator may utilize a data map of the first floor of a building and the "basic clean" function. The operator could create a new function, entitled "basic clean $1^{st}$ floor," in which the robot system accesses a map of the first floor and function tasks associated with each section of the first floor. Moreover, if the first floor area could be broken down into three sections A, B and C, in which sections A and C have tiles floors that must be swept, but B is carpeted and you must travel over section B to get from section A to C, or vice versa. In this example, the operator could program "basic clean $1^{st}$ floor," based upon the stored data map of the first floor, such that the robot would navigate and sweep section A, simply transport over section B and not perform any cleaning task, and then navigate and sweep section C.

It should be appreciated from this example, and others described below, that a function may be very broad, and may include more than one function task. Furthermore, functions may be associated with stored maps of area, in which the area can be broken down into smaller segments, each having different function tasks associated with each. These segments do not have to be contiguous, may overlap other area segments, and in general, can be defined in any suitable manner as desired by an operator. Therefore, a robot system may, as part of performing its commanded function, perform one task in three different area segments within an area, or six tasks within one area segment in an area, for example. Accordingly, one of ordinary skill in the art should be able to understand that the steps in the design and programming of functions, function tasks, and the associations with stored maps of areas, area layouts and area segments, can be accomplished in several ways without deviating from the spirit and scope of the present invention.

Robot System

FIG. 1 is a block diagram showing a robot system 10 in accordance with one embodiment of the system and method of the invention. As shown in FIG. 1, the robot system 10 includes a control portion 20. The control portion 20 includes a processor portion 100 and a memory portion 600. The robot system 10 further includes an interaction portion 700, a cleaning portion 800, and a transport portion 900. Each of the processor portion 100, the memory portion 600, the interaction portion 700, the cleaning portion 800 and the transport portion 900 are connected to and in communication with each other through a data bus 30. However, it should of course be appreciated that any suitable communication interface might be utilized to connect the operating components of the robot system 10.

The components of the robot system 10 as described above perform a wide variety of operations. The processor portion 100 monitors and controls the various operations of the robot system 10 as described in detail below. The memory portion 600 serves as a memory store for a wide variety of data used by the processor portion 100 as well as the other components of the robot system 10. As described below, the interaction portion 700 includes a variety of operational components that are controlled by the processor portion 100. Illustratively, the interaction portion 700 includes components that allow navigation of the robot system 10 and interaction with operators.

The robot system 10 further includes a cleaning portion 800. The cleaning portion 800 also includes a variety of components which are in communication with the processor portion 100 in accordance with some embodiments of the invention. The components contained in a cleaning portion 800 perform a variety of cleaning function tasks in the area the robot system is operating.

The robot system 10 further includes a transport portion 900. The transport portion 900 is controlled by the processor portion 100 based on data input to the processor portion 100. The transport portion 900 provides mobile capabilities to the robot system 10. The transport portion 900 may include a mechanical system of wheels or an electromechanical system, for example. Further details of the transport portion 900 are described below.

The block diagram of FIG. 1 illustrates various operating components of the robot system 10. It should be appreciated that the operating components of the robot system 10, or select operating components of the robot system 10, may be encased or enclosed in a suitable body or body portion 40, as illustrated in FIG. 1. Alternatively, it should be appreciated that the operating components of the robot system 10 may simply be suitably disposed on a support framework or structure.

Figure 2:
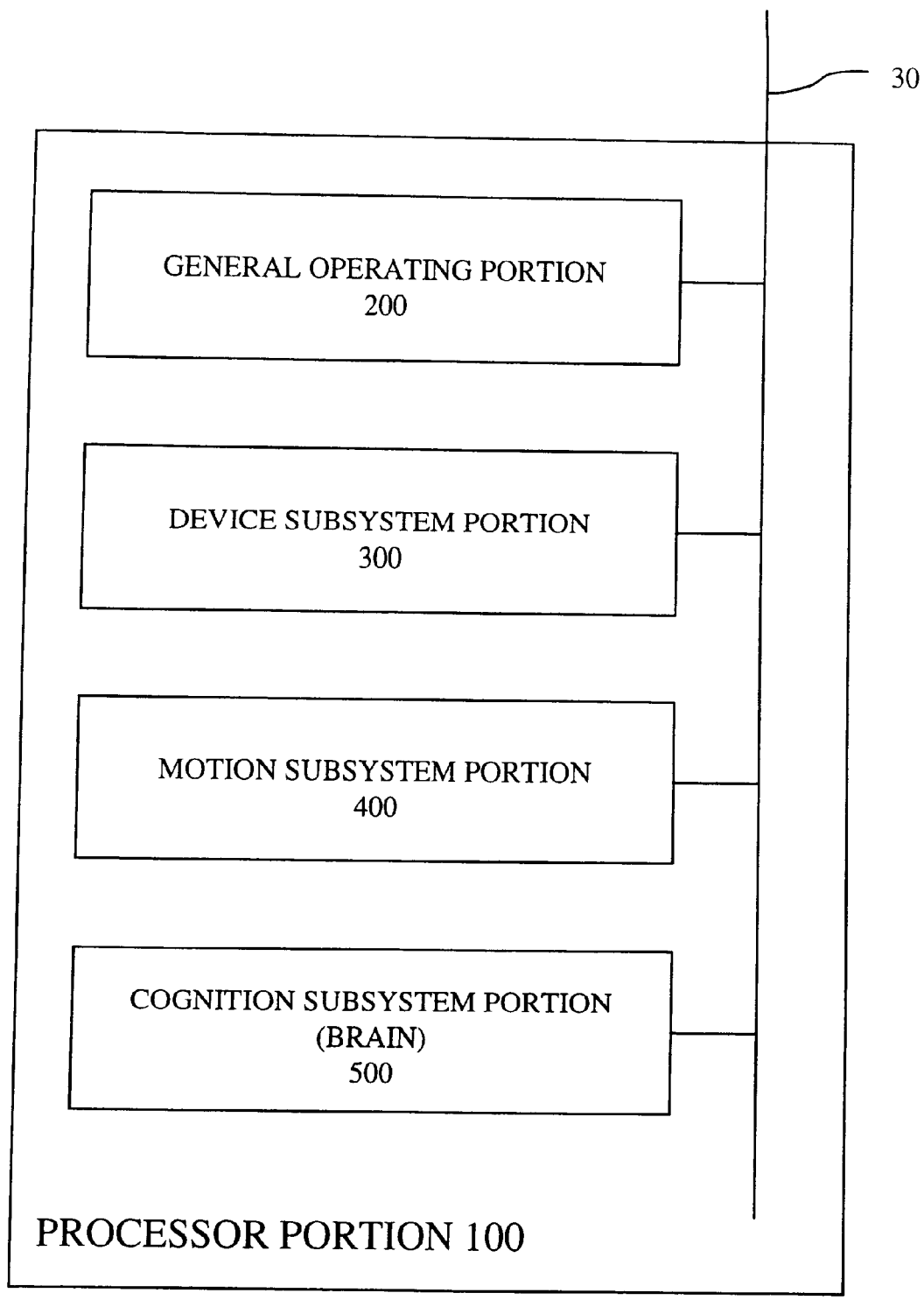
FIG. 2 is a block diagram showing the processor portion of FIG. 1 in further detail in accordance with one embodiment of the system and method of the invention.

FIG. 2 is a block diagram showing in further detail the processor portion 100. As shown in FIG. 2, the processor portion 100 includes a general operating portion 200, a device subsystem portion 300, a motion subsystem portion 400 and a cognition subsystem portion 500. The cognition subsystem 500 might be characterized as the "brain" of the robot system 10. The components of the processor portion 100 allow the robot system 10 to interact with operators and other robot systems, navigate within an area, and perform function tasks in the area. The general operating portion 200 controls general operations of the processor portion 100 not otherwise handled by the other processor portions. For example, the general operating portion 200 controls system and memory backup operations, virus protection processes and processor multitasking monitoring and control, for example.

The device subsystem portion 300 is responsible for controlling a variety of devices in the interaction portion 700, as well as devices in the cleaning portion 800. Illustratively, such devices in the interaction portion 700 and the cleaning portion 800 may be electrical, electromechanical or mechanical devices. As described further below, these devices include, but are not limited to, sonar sensors, laser sensors, odometry sensors, a gyroscope, a global positioning device (GPS), solution container, cleaning brush, vacuum device, squeegee device, a monitor, joy stick, magnetic strip readers, speakers, touch screens, keypads, a mouse, and motor controllers, for example. It should be appreciated that further devices may be included in the cleaning portion 800, such as a buffer device, waxing device, dryer device, mopping device, or other cleaning devices necessary to effectuate any of the above-described cleaning functions or tasks, for example.

The processor portion 100 also includes a motion subsystem portion 400. The motion subsystem portion 400 monitors and controls various navigational aspects of the robot system 10. Illustratively, the motion subsystem portion 400 determines the position of the robot system 10 in the area (i.e. localization), and controls navigation of the robot to different positions in area and along the function path. Further aspects of the motion subsystem portion 400 are described below with reference to FIG. 4.

As noted above, the processor portion 100 also includes a cognition subsystem portion 500. The cognition subsystem portion 500 is essentially the brain of the robot system 10. The cognition subsystem portion 500 is responsible for all cognitive tasks performed in the robot system 10 including environment interaction, logic processes, and game logic processes, for example.

Figure 3:
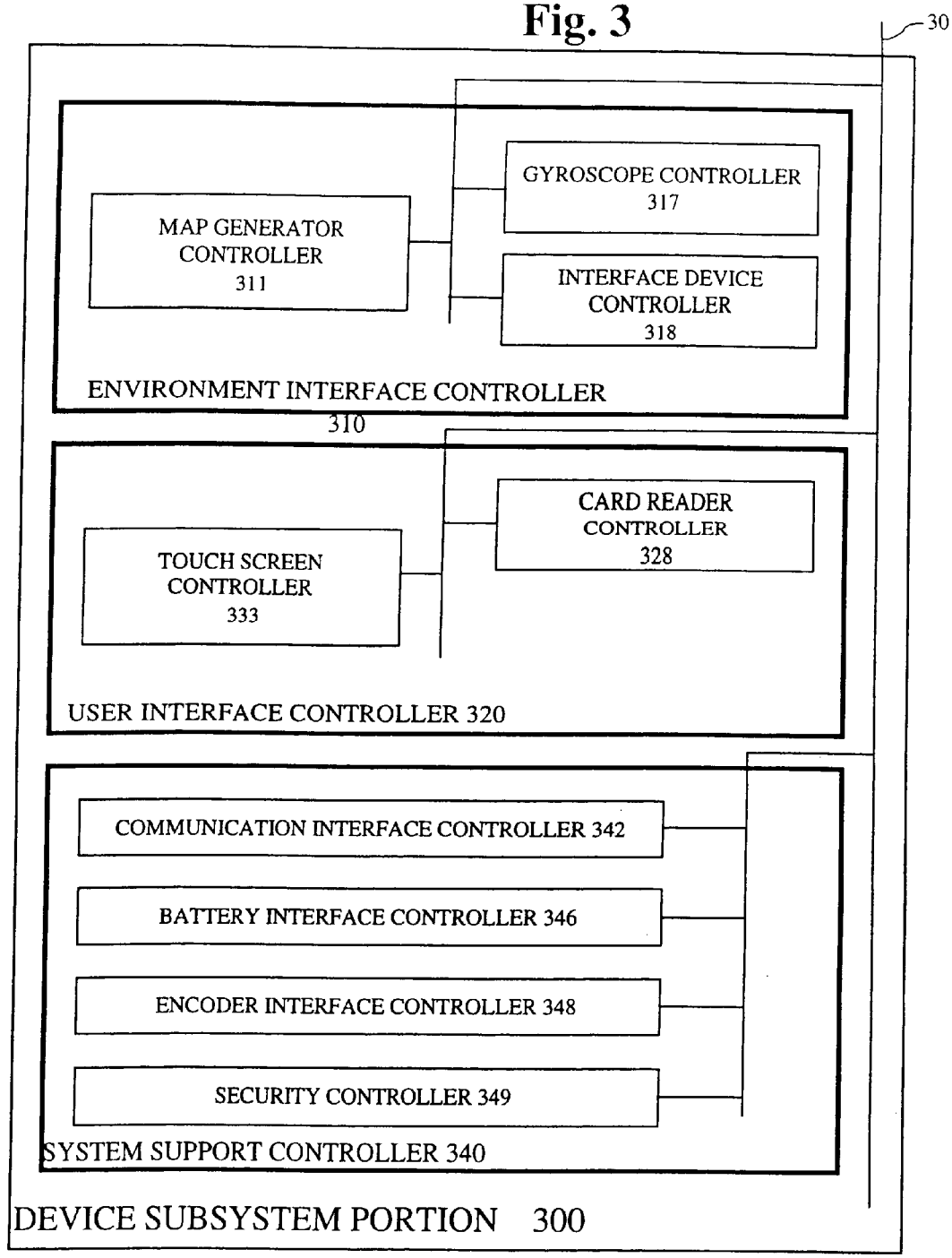
FIG. 3 is a block diagram showing the device subsystem portion of FIG. 2 in further detail in accordance with one embodiment of the system and method of the invention.

FIG. 3 shows the device subsystem portion 300 in further detail. As described above, the device subsystem portion 300 controls a variety of devices utilized in operation of the robot system 10. The device subsystem portion 300 includes an environment interface controller 310, a user interface controller 320, and system support controller 340.

The various controllers (310, 320, 340) respectively control operational devices in the interaction portion 700. The environment interface controller 310 in general controls devices utilized to input information regarding the area, as well as to navigate within the area. The user interface controller 320 in general controls a variety of devices utilized to input information from operators, and other robot systems, and output responsive information. Further, the system support controller 340 controls a variety of devices, not otherwise controlled by the environment interface controller 310 or the user interface controller 320, that are used in operation of the robot system 10. Further aspects of the controllers (310, 320, 340) will be described with reference to FIG. 6 below.

Hereinafter further aspects of the motion subsystem portion 400 will be described with reference to FIG. 4.

Figure 4:
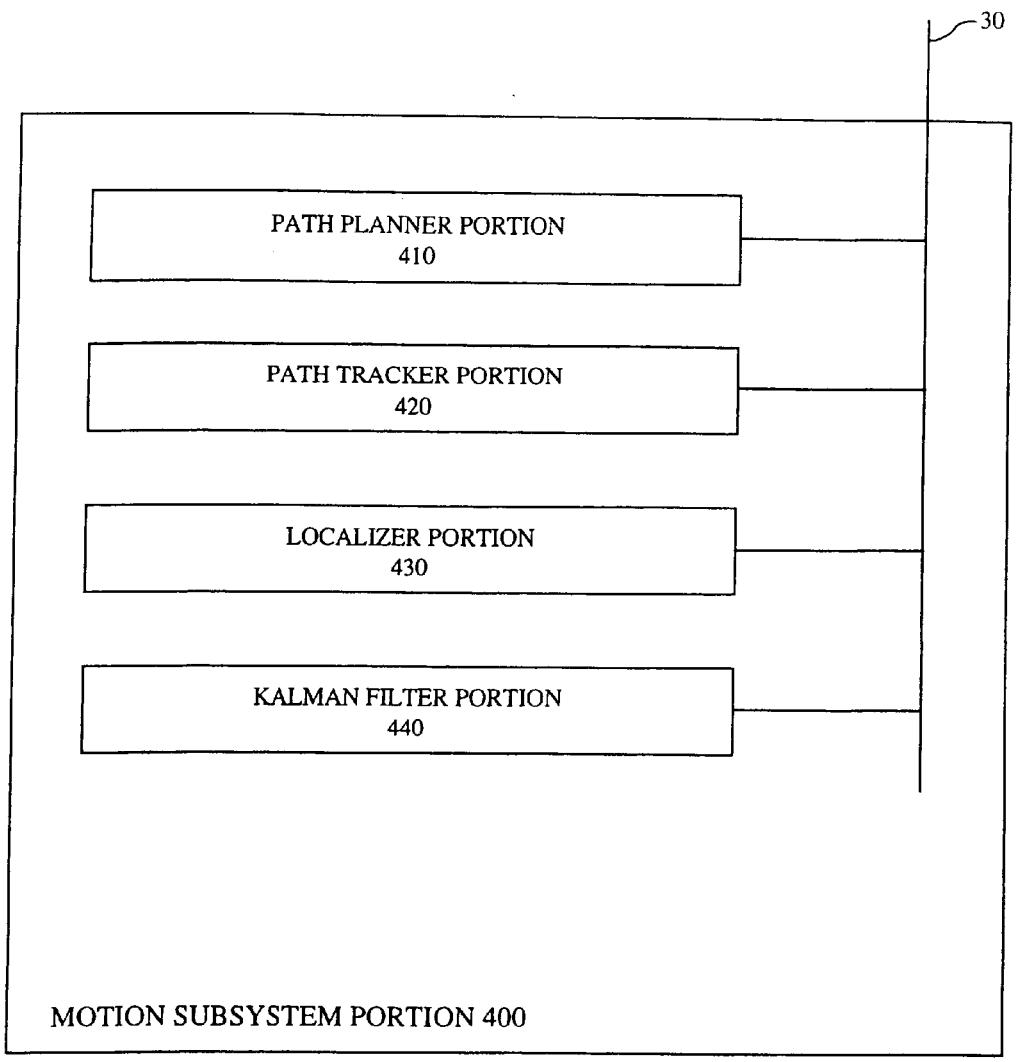
FIG. 4 is a block diagram showing the motion subsystem portion of FIG. 2 in further detail in accordance with one embodiment of the system and method of the invention.

FIG. 4 is a block diagram showing further details of the motion subsystem portion 400. The motion subsystem 400 includes a path planner portion 410, a path tracker portion 420, a localizer portion 430, and a Kalman filter portion 440. As noted above, the motion subsystem portion 400 monitors and controls a variety of navigational aspects of the robot system 10. The localizer portion 430 is responsible for gathering a variety of sensor information. For example, the sensor information may include laser data, sonar data, odometry data, gyroscope data, global position system (GPS) data, pre-stored maps data, and x-y position system, i.e., grid data, for example. Accordingly, in one embodiment, the localizer portion 430 accesses a stored map of the area layout in which the robot system has been commanded to perform a function. The localizer portion 430 then localizes the robot system's position in the area and associates that current position with an actual position on the stored map. Utilizing the current position and the actual position on the stored map, the path planner portion 410 may determine a function path for the robot system to complete its assigned function and tasks. Furthermore, the localizer portion 430 utilizes the devices contained in the interaction portion 700 shown in FIG. 6. Accordingly, the localizer portion 430 determines the position and heading of the robot system 10 in the area in which the robot system 10 is operating.

The path planner portion 410, based on a variety of input, generates a desired path of travel for traveling from a current position of the robot system 10 to a final position in the area once the assigned function and tasks have been completed. A suitable algorithm or other logic may be utilized by the path planner portion 410 to generate such a desired path of travel. According to one embodiment of the invention, the path planner portion 410 may utilize stored pre-determined function paths for given areas to complete assigned function tasks upon localization in the area.

It should also be appreciated that the localizer portion 430 may detect obstacles in the planned path of the robot system 10 while the robot system 10 is moving along the path. When an obstacle is detected, the localizer portion 430 communicates with the path tracker portion 420 to stop the robot system's 10 movement, and the path planner portion 410 to generate an amended function path, thus, avoiding the obstacle.

Once the path of travel is generated by the path planner portion 410, the path tracker portion 420 utilizes this information. Specifically, the path tracker portion 420 uses the path information from the path planner, as well as the position information from the localizer portion 430, to control the robot system 10 to move along the desired function path. The path tracker portion 420 may utilize a suitable logic or algorithm as is necessary or desired. The path tracker portion 420 may further include an obstacle avoidance planner portion which may track the position of obstacles detected in the area and in the function path of the robot system.

Alternatively to the localizer portion 430, it should be appreciated that the Kalman filter 440 may be employed by the localizer portion 430 to assist in the prediction of the robot system's position based on a current sensor position. It should be appreciated that the various software pieces illustrated in the motion subsystem 400 perform separate tasks, as described above. However, it should be appreciated that in another embodiment of the system of the invention, two or more of these respective tasks may be performed by a single processor, or alternatively, the tasks performed by a particular component may be further broken down into multiple processing components.

Figure 5:
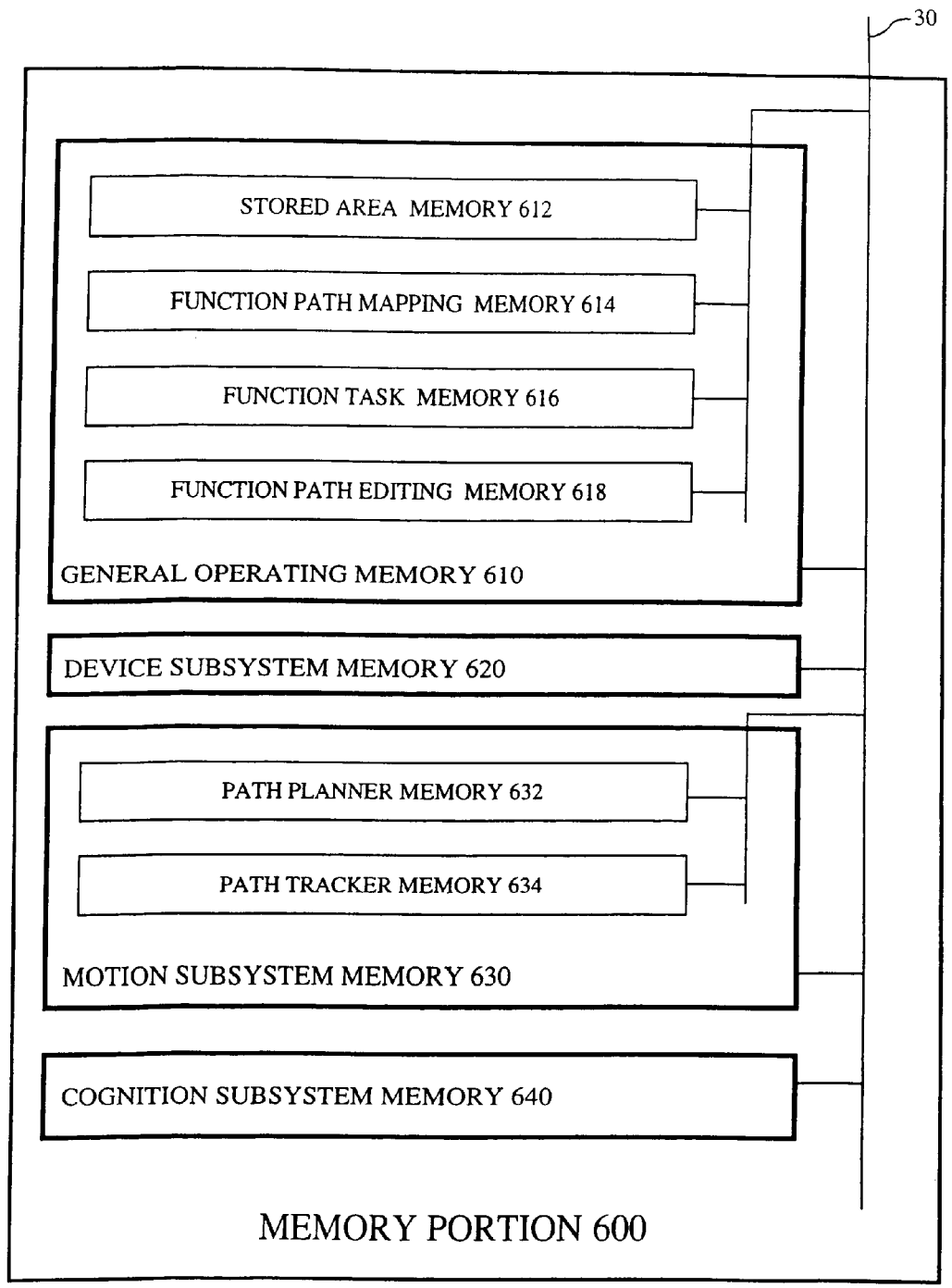
FIG. 5 is a block diagram showing the memory portion of FIG. 1 in further detail in accordance with one embodiment of the system and method of the invention.

As shown in FIG. 1, the control portion 20 in the robot system 10 includes a memory portion 600. The memory portion 600 stores a variety of data utilized in operation of the robot system 10. FIG. 5 is a block diagram showing further details of the memory portion 600.

As shown in FIG. 5, the memory portion 600 includes a general operating memory 610, a device subsystem memory 620, a motion subsystem memory 630, and a cognition subsystem memory 640.

The general operating memory 610 in the memory portion 600 stores a wide variety of data used by the general operating portion 200 in general operations of the robot system 10. Furthermore, the general operating memory 610 contains specialty data stores in accordance with one embodiment of the system of the invention. Specifically, the general operating memory 610 includes a stored area memory 612, a function path mapping memory 614, a function task memory 616 and a function path editing memory 618.

These data stores contain various information related to the particular area within which the robot system 10 is operating. Illustratively, the stored area memory 612 may contain data and/or files relating to area layouts and area segments. The function task memory 616 may contain data and/or files relating to functions, function commands, function tasks, and associations between this information and data on areas, area layouts and area segments. The function path mapping memory 614 may store data and input information acquired by then robot system 10 and utilized to produce maps of different areas. In addition, the function path editing memory 618 may store a wide variety of data related to the editing of stored maps of areas, area layouts or area segments, as is necessary or desired. While the general operating memory 610 of FIG. 5, as well as the other memories (620, 630, 640) illustrate one embodiment of the system of the invention, it should of course be appreciated that the various memory stores are widely adaptable to the particular operating environment in which the robot system 10 is disposed and may be altered accordingly. It should be appreciated that these data stores may contain information on several different areas wherein the robot system may be called upon to perform various functions.

The memory portion 600 also includes the device subsystem memory 620. The device subsystem memory 620 is the memory store utilized by the device subsystem portion 300. Accordingly, the device subsystem memory 620 stores a variety of information related to operation of the devices in the interaction portion 700, which are controlled by the device subsystem portion 300.

The memory portion 600 also includes a motion subsystem memory 630. The motion subsystem memory 630 is the memory store utilized by the components of the motion subsystem portion 400, i.e., the path planner portion 410, the path tracker portion 420, the localizer portion 430 and the Kalman filter 440. In addition to the general memory stores contained in the motion subsystem memory 630, there are also specialty data stores. Specifically, the motion subsystem memory 630 includes a path planner memory 632 and a path tracker memory 634 utilized by the path planner portion 410 and the path tracker portion 420, respectively.

The memory portion 600 also includes a cognition subsystem memory 640. The cognition subsystem memory 640 serves as the memory store for the cognition subsystem portion 500, which is shown in FIG. 2. Accordingly, the cognition subsystem memory 640 contains a wide variety of data utilized in the cognitive operations performed by the cognition subsystem portion 500. Illustratively, the cognition subsystem memory 640 may contain data associating particular observed inputs with desired outputs.

It should be appreciated that the various memory components contained in the memory portion 600 may take on a variety of architectures as is necessary or desired by the particular operating circumstances. Further, the various memory components of the memory portion 600 may exchange data or utilize other memory component data utilizing known techniques such as relational database techniques.

Hereinafter, further details of the device subsystem portion 300, shown in FIG. 3, will be described in conjunction with the interaction portion 700 shown in FIG. 6. As described above, the interaction portion 700 contains various components to collect information and data from the area in which the robot system 10 is operating, as well as to output information and data. The interaction portion 700 includes an environment interface portion 710, a user interface portion 720 and a system support portion 740. The environment interface portion 710 collects various information regarding the area in which the robot system 10 is operating, as well as information regarding travel of the robot system 10 through the area. The user interface portion 720 generally provides operator interaction capabilities. That is, the user interface portion 720 is controlled by the processor portion 100, or components thereof, to interface with an operator or other robot system including inputting commands and outputting data or information relating to the areas and functions. The system support portion 740 contains a variety of operational components of a more general type not contained in either the environment interface portion 710 or the user interface portion 720. Hereinafter, further details of the portions (710, 720, 740) will be described.

Figure 6:
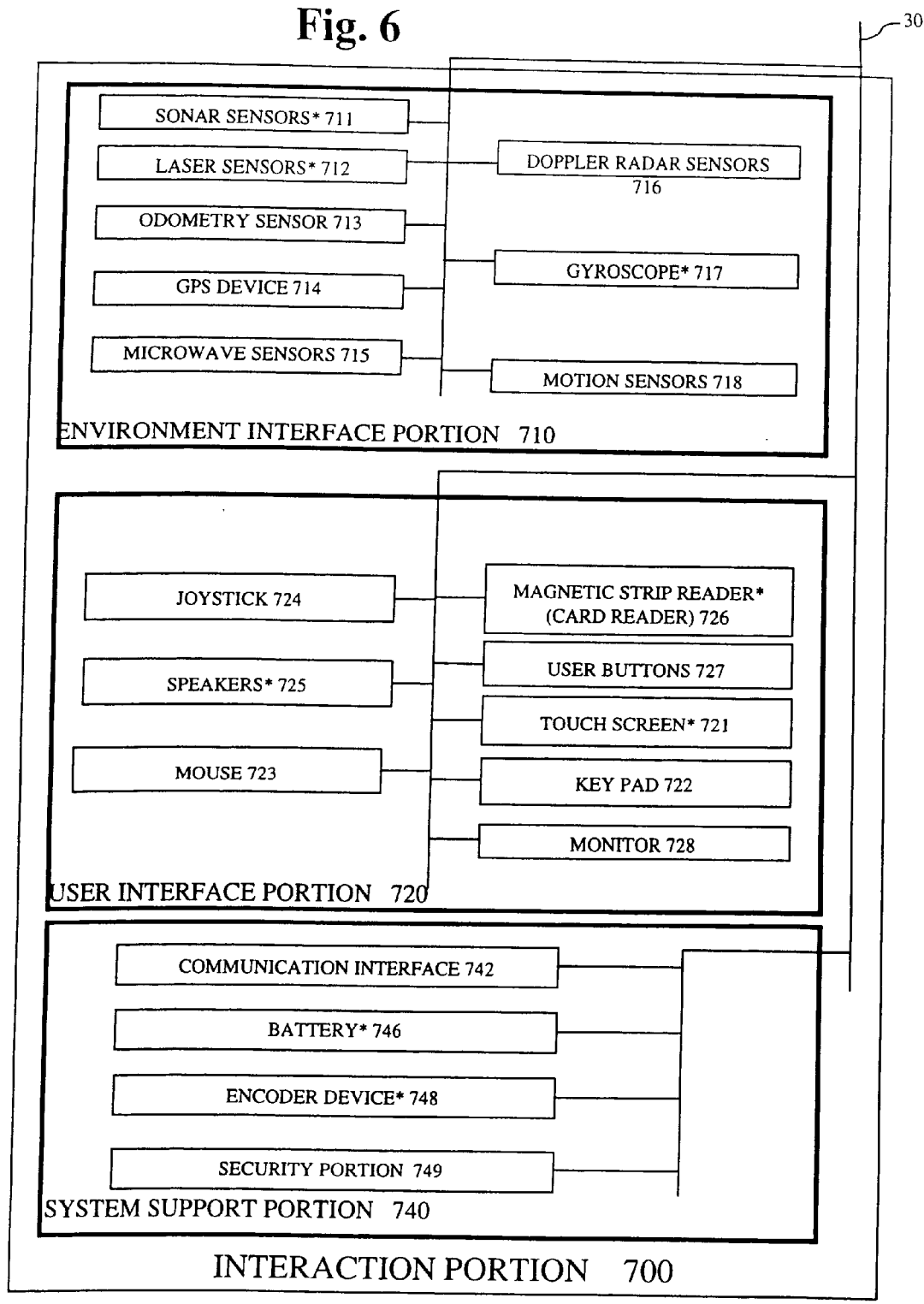
FIG. 6 is a block diagram showing the interaction portion of FIG. 1 in further detail in accordance with one embodiment of the system and method of the invention.

The environment interface portion 710 as shown in FIG. 6, contains a variety of components to input information from the area in which the robot system 10 is operating. More specifically, the environment interface portion 710 may include sonar sensors 711, laser sensors 712, an odometry sensor 713, a global position (GPS) device 714, microwave sensors 715, Doppler radar sensors 716, a gyroscope 717, and motion sensors 718, for example. Further, it should be appreciated that other suitable input devices might be utilized such as an x-y grid device, drive control boards, a gaseous sensor, a heat sensor, a camera, a recording portion, air quality sensors, flame sensors, a metal detector, for example.

Each of the components in the environment interface portion 710 perform respective operations. The various components in the environment interface portion 710 are in general controlled by the environment interface controller 310, which includes sub-processing systems that respectively control some of the components in the environment interface portion 710. More specifically, the map generator controller 311 controls and receives feedback from the sonar sensors 711 and the laser sensors 712. Furthermore, the gyroscope controller 317 controls the gyroscope 717. The interface device controller 318 controls any additional devices in the environment interface portion 710 that are not controlled by the map generator controller 311 or gyroscope controller 317.

Hereinafter, further aspects of the devices shown in the environment interface portion 710 of FIG. 6 will be described in further detail. As noted above, the environment interface controller 310 monitors and controls the various devices contained in the environment interface portion 710.

The environment interface portion 710 includes sonar sensors 711 and laser sensors 712, which are both responsible for the "localization" or determining the positioning of the robot system 10 within the are in which the robot system is operating. The sonar sensors 711 and laser sensors 712 can be utilized to determine positions of the robot system 10 in the area, and during navigation of the function path and completion of tasks. Accordingly, in one embodiment of the invention, the robot system 10 utilizes the sonar sensors 711 and laser sensors 712 to continuously localize the position of the robot system 10 in the area in which the robot system 10 is operating.

Each of the sonar sensors 711 and the laser sensors 712 are controlled by the map generator controller 311. The sonar sensors 711 and the laser sensors 712 provide the map generator controller 311 with various spatial information regarding the surrounding area in which the robot system 10 is operating. Specifically, the sonar sensors 711 transmits and detects reflected acoustic waves to determine surrounding objects. The sonar sensors 711 in accordance with the system of the invention can detect both static objects, i.e., such as a wall, or dynamic objects such as a moving person. The sonar sensors 711 conveys gathered information back to the map generator controller 311. Thereafter, the map generator controller 311 outputs the processed information to other components in the robot system 10 as is desired or necessary.

Similarly, the laser sensors 712 gather information utilizing laser technology. For example, the laser sensors 712 may include a device that converts incident electromagnetic radiation of mixed frequencies to coherent visible radiation having one or more discreet frequencies. The reflection of this radiation off surrounding objects may be sensed by the laser sensors 712 so as to determine the surrounding area specifics. The laser sensors 712 in accordance with the system of the invention can also detect both static objects, i.e., such as a wall, or dynamic objects such as a moving person. The laser sensors 712 conveys gathered information back to the map generator controller 311. Thereafter, the map generator controller 311 outputs the processed information to other components in the robot system 10 as is desired or necessary.

As described above, the sonar or laser sensors, as well as other sensor input devices, may be utilized in the system of the invention to produce a map of an area in which the robot system will operate. It should be appreciated that the robot system may receive a command to map an area, for example. Accordingly, the map generator controller 311 would utilize the information and data gathered by the sonar and laser sensors to create a map of the area sensed. Once the area layout of an area is determined, for example, an operator could utilize a stored map of an area to develop an increasingly enhanced navigational capability in the area for later navigation by the robot system. Alternatively, the robot system could generate a map of the area for alternate uses such as providing floor plans, emergency exit maps, for example.

Furthermore, it should be appreciated that the robot system may create updated maps of the area layout when obstacles are detected in the area layout. Once detected, the obstacles can be added to an amended map of the area layout that could be utilized from thereon. Also, if the robot system continued to operate within the area layout and later the obstacle was removed, the robot system could either create another amended map that removed the obstacle, or could return to the previous stored map. In this respect, the robot system could operate efficiently in an environment such as a grocery store where floor displays are constantly being moved and rearranged.

It should also be appreciated that the updating of stored maps by the robot system can be effectuated in several different fashions. For example, the operator may set the updating of a stored map to occur on the detection of an obstacle for the third consecutive cleaning cycle through a given area layout. Therefore, the operator may program the robot system to create an amended map only upon three detections of an obstacle to avoid unnecessary effort. The number of repeated detections of an obstacle before it is added to a map of the area layout can be determined by one of ordinary skill in the art based upon the needs of the given area layout.

Alternatively, it should be appreciated that a robot in accordance with the system of the invention, the robot system might be manually taught regarding the surroundings. Accordingly, the robot system could receive data and input relating to obstacles in the environment as well as the location of beacons relative to those objects. In another embodiment, an operator may edit a pre-determined stored map, change the nature of mapped boundaries in the area layout, i.e., increase the size of a room, add a doorway, or place a pillar in a hallway, and the robot system would receive updated information on the area. In addition to a training process or a manual process, other suitable techniques may be utilized to provide improved navigational capabilities to the robot system.

The environment interface portion 710 also includes an odometry sensor 716. The odometry sensor 716 may monitor the distance traveled by the robot system 10 for any of a variety of purposes. For example, the distance traveled by the robot system 10 may be utilized in combination with a stored map of an area to provide an efficient function path for performing assigned tasks. Alternatively, the distance traveled might assist in estimations relating to when replenishment of the robot system 10 will be required. The information gathered by the odometry sensor 716, as well as the information gathered in the other components of the environment interface portion 710, may be stored in the device subsystem memory 620 in accordance with one embodiment of the system of the invention.

The environment interface portion 710 also includes a gyroscope 717. The gyroscope 717 is monitored and controlled by the gyroscope controller 317 in the environment interface controller 310 as shown in FIG. 3. Illustratively, the gyroscope 717 may include a known structure using orientational gyroscope technology, that comprises a spinning mass, the spin access of which is allowed to rotate between low-friction supports so as to maintain its angular orientation with respect to initial coordinates when the spinning mass is not subjected to external torque. Accordingly, the gyroscope 717 provides feedback to the gyroscope controller 317 indicative of movement of the robot system 10. Alternatively, other gyroscope technology may be utilized. For example, tuning fork or laser ring gyroscope technology might be utilized in conjunction with the system and method of the invention.

As described above, the localizer portion 430 in the motion subsystem portion 400, as shown in FIG. 4, is responsible for gathering sensor information and determining the position or heading of the robot system 10. Accordingly, a purpose of the localizer portion 430 is to assist in navigation of the robot system 10 in its travels through the area in which the robot system 10 is operating, i.e. along a function path. The map generator controller 311 assists the localizer portion 430 in its operations. Specifically, the map generator controller 311 forwards information it gathers from the sonar sensor 711 and/or the laser sensors 712 and forwards that information to the localizer portion 430.

The user interface portion 720 as shown in FIG. 6, contains a variety of components utilized to interface with a customer in an area. Specifically, the user interface portion 720 includes a touch screen 721, a keypad 722, a mouse 723, a joystick 724, speakers 725, a magnetic strip reader 726, i.e., a card reader, user buttons 727, and a monitor 728, for example. The user interface portion may include additional components including, for example, an armature, a microphone, or printer.

The various components in the user interface portion 720 are controlled by the user interface controller 320, in general, or alternatively, by a sub-processing system of the user interface controller 320. Also, the user interface controller 320 outputs data to the speakers 723 so as to provide audible messages, automated alert signals for robot operation, or simulated speech and voice generation using the speakers, for example. In addition, the card reader controller 328 in the user interface controller 320 controls and inputs information from the magnetic strip reader 726. Similarly, the touch screen controller 333 in the user interface controller 320 controls and inputs information from the touch screen 721 and key pad 722.

Hereinafter, further aspects of the user interface portion 720 will be described. As set forth above, the user interface portion 720 includes a variety of devices used to operate the robot system in an area to perform a function. The devices in the user interface portion 720 are controlled by the user interface controller 320 or a sub-component thereof.

With further reference to FIG. 6, the user interface portion 720 includes a touch screen 721 and key pad 722 that are controlled by a specialized processing component in the user interface controller 320, which is the touch screen controller 333. An operator may use the touch screen 733 to input information into the robot system 10, i.e. commands to perform a function. In one embodiment, an operator may use the touch screen 733 to command a cleaning robot system to perform a cleaning function in a given area. For example, the touch screen 733 could be used to select a specific hallway, and the operator could specify that the floor of the hallway should be washed and waxed. In addition, an operator could utilize the key pad 722, or any combination of the touch screen and key pad to give similar commands.

Further, the user interface portion 720 includes a mouse 723, joystick 724, user buttons 727, and monitor 728. Each of these additional components may be utilized to input a wide variety of information into the robot system 10. For example, each of these components could be utilized to command the robot system, including changing the function path, for example.

The user interface portion 720 also includes a magnetic strip reader 730, i.e., a card reader. Alternatively, it should be appreciated that barcode or laser scanners might also be utilized. The magnetic strip reader 726 is controlled by the card reader controller 328. In one embodiment, the magnetic strip reader 726 may be utilized to identify an operator, wherein the robot system would not respond to a given command unless the command came from an identified and authorized operator, for example.

The system support portion 740 as shown in FIG. 6 includes a variety of components used to support operation of the robot system 10. Specifically, the system support portion 740 includes a communication interface 742, a battery 746, an encoder device 748, and a security portion 749.

The devices in the system support portion 740 are controlled by respective processing components in the system support controller 340. That is, the communication interface controller 342 controls operation of the communication interface 742. The battery interface controller 346 controls operation of the battery 746. The encoder interface controller 348 controls operation of the encoder device 748. Lastly, the security controller 349 controls the security portion 749.

Hereinafter, further aspects of the components in the system support portion 740, as shown in FIG. 6, will be described. The system support portion 740 includes the communication interface 742. The communication interface 742 is controlled by the communication interface controller 342, as shown in FIG. 3. The communication interface 742 provides for transmission of data both to the robot system 10 and from the robot system 10. In accordance with one embodiment of the invention, the communication interface 742 is a wireless device. Various communications techniques may be utilized to provide the wireless transmission both to and from the robot system 10, including radio, spread spectrum, infrared line of sight, cellular, microwave, or satellite, for example. Further, the communication interface 742 may use wire technology wherein a physical cable is running from the robot system 10 to a desired location, such as a modem which may then be connected to the Internet, for example. In particular, the wire technology may be utilized where the robot system 10 is operated in a small defined area.

The system support portion 740 also includes a battery 746. The battery 746 is monitored and controlled by the battery interface controller 346. The battery 746 may be any suitable type including lithium polymer, nickel cadmium, nickel hydride, lead acid, lithium ion, lithium polymer, zinc air or alkaline, for example. Further, it should be appreciated that a plurality of batteries may be utilized that are the same or different types. This may be preferable in that various processing systems and operational devices utilized on the robot system 10 may optimally utilize different types of batteries for enhanced performance. The battery interface controller 346 monitors the battery 746, or alternatively batteries, for possible malfunctions and recharging requirements. Once the battery interface controller 346 determines that a battery 746 requires recharging or replacement, the battery interface controller 346 works in conjunction with the other processing portions and devices to effect travel of the robot system 10 to a recharging station, in accordance with one embodiment of the invention.

The system support portion also includes a security portion 749 that is controlled by the security controller 349 in the system support controller 340. The security portion 749 working in conjunction with the security controller 349 provides various capabilities related to security of both the area in which the robot system 10 is operating, as well as the robot system 10 itself. For example, the security controller 749 may provide theft detection capabilities. For example, the security portion 749 may include a proximity sensor that interacts with a base station, an embodiment of which is described below. As a result, once the robot system 10 is a predetermined distance away from the base station various operations may be performed such as sounding an audio alarm, electronically transmitting a signal to close exit ways, or effecting certain mechanical operations such as locking wheels of the robot system 10 so as to hinder transport.

Further, it should be appreciated that the processing capabilities of the security controller 349 may also utilize input devices controlled by the environment interface controller 310 and the user interface controller 320. For example, the security controller 349 may direct that a communication or message, describing an emergency condition, be dispatched to an emergency services provider, such as the police, fire department or building manager. Accordingly, if the robot system 10 detected smoke in an operation area, the security controller 349 could alert the fire department of the emergency. This monitoring is controlled by the security controller 349, working in conjunction with the other processing systems.

Figure 7:
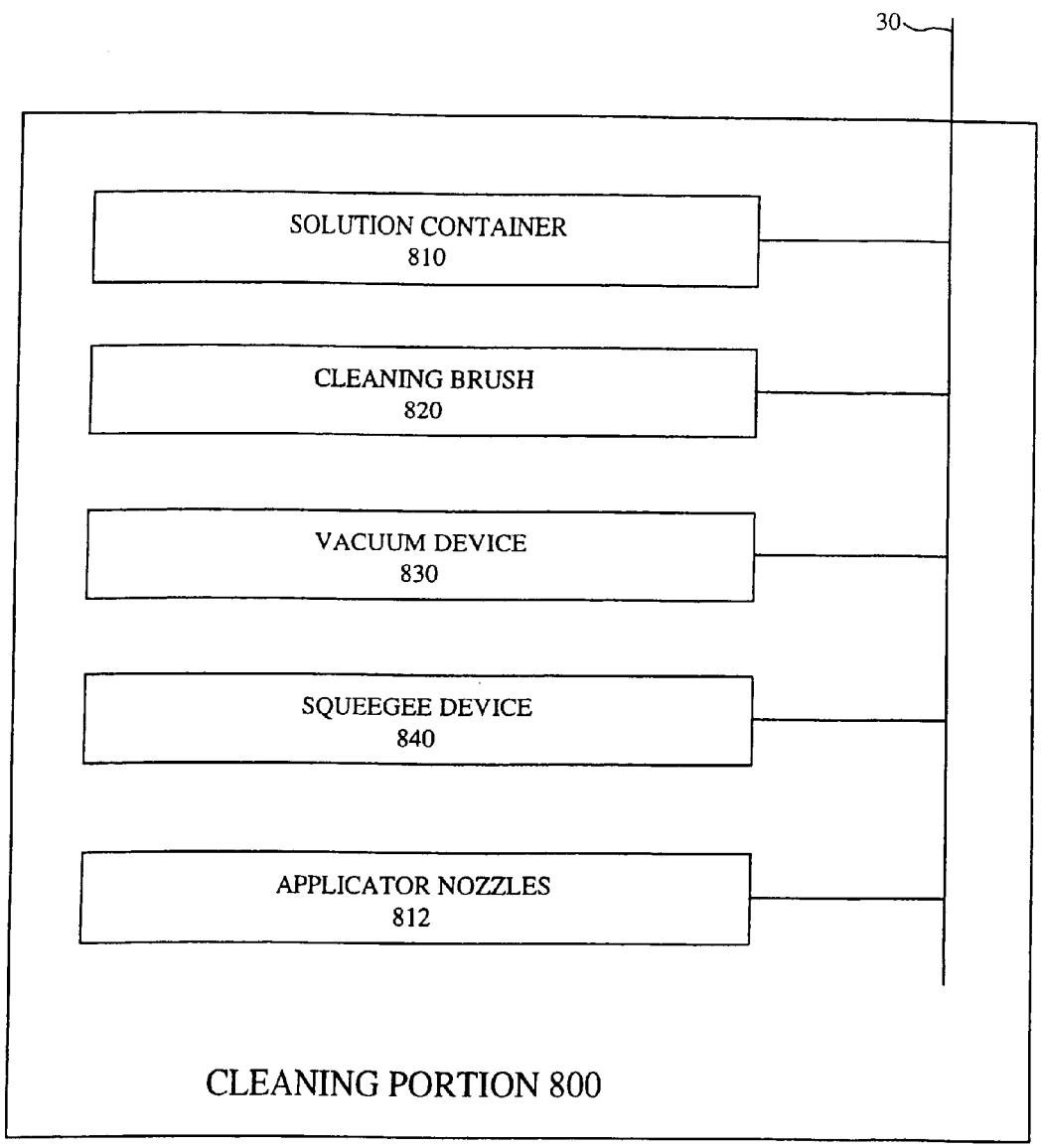
FIG. 7 is a block diagram showing the cleaning portion of FIG. 1 in further detail in accordance with one embodiment of the system and method of the invention.

As described above, FIG. 1 includes a cleaning portion 800 in accordance with one embodiment of the system and method of the invention. FIG. 7 is a block diagram showing the cleaning portion 800 in further detail. In general, the cleaning portion 800 includes various operational components providing additional capabilities to the robot system 10, i.e. the ability to perform cleaning functions.

In accordance with this embodiment of the invention, the components in the cleaning portion 800 provide feedback to the device subsystem portion 300, which monitors and controls operation of the components of the customer service device portion 800.

In accordance with one embodiment of the system and method of the invention, the cleaning portion 800 includes a solution container 810, applicator nozzles 812, a cleaning brush 820, a vacuum device 830, and a squeegee device 840.

The solution container 810 is a physical container that is disposed on the robot system 10 in accordance with one embodiment of the invention. For example, the solution container 810 may be disposed on or within the body portion 40 so as to be accessible by an operator, i.e. for filling and refilling cleaning solution. It should be appreciated that a sensor or sensors may be disposed in the holding container 810 to monitor the quantity of solution disposed in the solution container 810. Accordingly, once such sensors in the solution container 810 convey feedback to the device subsystem portion 300 that the quantity of solution is sufficiently diminished, then the device subsystem portion 300 may effect a desired action. For example, the device subsystem portion 300 may effect travel of the robot system 10 to a predetermined location such that the solution container 810 may be refilled with more solution. Additionally, the cleaning portion 800 also includes applicator nozzles 812 for use in the application of the cleaning solution in the operation of the robot system 10.

The cleaning portion 800 also includes a cleaning brush 820. The brush 820 is disposed on the body portion 40 such that it may be utilized to perform a cleaning function upon command. Similarly, a vacuum device 830 is provided in the cleaning portion 800, and disposed on the body portion 40 such that it may be utilized to vacuum an area upon command. Lastly, a squeegee device 840 is provided in the cleaning portion 800, and disposed on the body portion 40 such that it may be utilized to perform a cleaning function upon command.

As described above, the robot system 10 includes a transport portion 900. The transport portion 900 is controlled by the device subsystem portion 300. In summary, the device subsystem portion 300 inputs various information from the interaction portion 700 including operator commands, for example. As a result, the robot system 10 moves to a position and location where the robot system 10 can complete the function it has been commanded to perform. Working in conjunction with the motion subsystem portion 400, the device subsystem portion 300 utilizes the transport portion 900 to effect this movement of the robot system 10.

Figure 8:
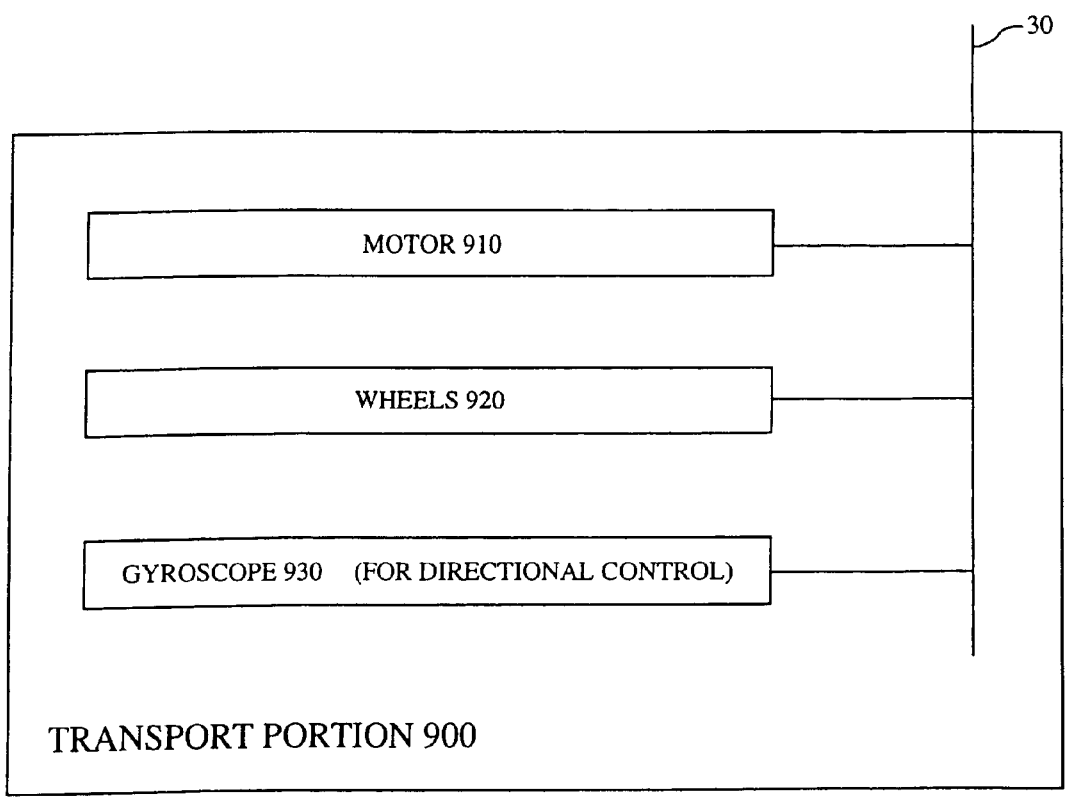
FIG. 8 is a block diagram showing the transport portion of FIG. 1 in further detail in accordance with one embodiment of the system and method of the invention.

The transport portion 900 as shown in FIG. 8 controls various mechanical or electro mechanical components needed to effect physical movement of the robot system 10. Specifically, the transport portion 900 includes a motor 910 used to drive the wheels 920. The motor 910 may be powered by the battery 746. Further, various directional devices and sensors may be utilized as is needed or desired. In one embodiment, the robot system 10 utilizes data gathered from sonar sensors 711 and laser sensors 712 to continuously localize the position of the robot system 10, and guide the movement of the robot system 10 along a determined function path. In addition, the transport portion 900 may utilize a gyroscope 930 to monitor and control the direction of travel of the robot system 10.

As described above, the robot system 10 includes a touch screen 733, which provides a graphical user interface (GUI). The graphical user interface is a device that utilizes separate passive process that performs two functions. These two functions include: (1) display of images on the touch screen as controlled by the cognition subsystem portion 500, and (2) informing the cognition subsystem portion 500 of the location of any touches on the touch screen 733. In accordance with one embodiment, all logic is removed from the graphical user interface, i.e. the touch screen 733. As a result, a clean division of the robot system's "brain" and the graphical user interface operation, i.e., the operation of a device, is achieved.

Hereinafter additional features in accordance with further embodiments of the method and system of the invention will be described. It should be appreciated that the various features and embodiments described herein may be utilized in combination with a variety of known technology. For example, the above features and embodiments may be used in conjunction with the features described in U.S. Pat. No. 5,548,511, which is incorporated herein by reference in its entirety, and U.S. Pat. No. 6,124,694, which is incorporated herein by reference in its entirety. Further, it should be appreciated that the various embodiments and features described herein may be used in conjunction with features in U.S. patent application Ser. No. 09/906,216, Attorney Docket No. 55274.000014, directed to system for a retail environment, which is incorporated herein by reference in its entirety. Further, it should be appreciated that the various embodiments and features described herein may be used in conjunction with features in U.S. patent application Ser. No. 09/906,159, Attorney Docket No. 55274.000018, directed to methods for facilitating a retail environment, which is incorporated herein by reference in its entirety.

It should be appreciated that a wide variety of interactions may be performed between different robots in accordance with the method and system of the invention. The robots may be in communication utilizing any suitable wireless technology, for example, such as a gateway. For example, one robot could be washing a first area, while another robot is vacuuming a second area. At a predetermined time, the robots might communicate with each other to determine if each robot is done with their respective tasks, thus allowing the robots to switch areas to perform the other functions, for example. In addition, if the system determines that one robot is low on cleaning solution, a second robot could be dispatched from another area to finish the cleaning solution washing.

Additionally, it should be appreciated that one robot might communicate with multiple other robots. For example, one robot, while busy performing one function, might be commanded to perform a second function. As a result, that robot might communicate with a fleet of robots in the area to determine which robot in the fleet is available to perform the second function. As noted above, a gateway might be utilized to route communication between the robots. The gateway might be characterized as a traffic controller or a coordinator between the various robots.

In accordance with a further embodiment of the system and method of the invention, it should be appreciated that a particular robot may be guided by a device, such as a mouse, in a remote location. To explain, it should be appreciated that a camera mounted upon the robot may input information using the camera and communicate that visual information to a distant location, where a human operator is monitoring and controlling movement of the robot. Thus, using a mouse or other suitable device, the operator may control movement of the robot through a particular area and obtain visual information based on the travels of the robot.

The robot system 10 may communicate with the Internet, and Ethernet, other network systems, or other processing systems, utilizing wireless technology. For example, the robot system 10 may use streaming video technology.

In accordance with one embodiment of the robot system 10, the body portion 30, as described above, is an outer shell. The outer shell may be formed in any of a wide variety of shapes depending on the area and functions in which the robot system is to be used.

The robot system may also utilize voice recognition techniques in operations of the robot system 10. The voice recognition techniques may identify a particular operator, or alternatively, accept a given command to perform a function.

As described above, a Kalman filter portion 440 may be utilized in the motion sub-system portion 400. For example, an off-the-shelf Kalman filter may be utilized in accordance with one embodiment of the system and method of the invention. The Kalman filter takes input and then processes that input to generate navigation information. Various sensor inputs may be utilized including sonar information, odometry information, and gyroscope information. The Kalman filter may be utilized to assess the accuracy of the various inputs.

Further, an encoder device 748 may be utilized in the support system portion 740 as described above. The encoder device may be utilized to control operation of the drive wheels, for example. Illustratively, the processing portion or control portion of the robot system 10 may command the motors to turn the robot system 10 at a certain rate or, alternatively, to travel 4 feet. However, the motors do not know exactly what 4 feet is and, as a result, the motors receive feedback from an encoder mechanism, i.e., a disk or optical reader, to provide feedback information. A portion of the encoder mechanism is disposed on and spinning with the wheels. For example, there may be slots utilized in the encoder and the control system knows that there are, for example, 1000 slots, and 4000 slots are necessary to travel a distance of 4 feet. For example, an optical encoder may be positioned on the drive shaft of the motor, or alternatively on a wheel, keeping track of wheel rotation. It should further be appreciated that it is not required that the encoder actually be disposed on the driven wheel. For example, the encoder device could be disposed on a free rolling trailing wheel, for example. The rotation of the trailing wheel would provide the necessary feedback to a motor control mechanism to monitor the driven wheel, i.e., the travel of the robot system, as is necessary or desired.

As described above with reference to FIG. 6, the environment interface portion 710 may include a gyroscope 717. The gyroscope may be thought of a rotational compass. It should be appreciated that various known techniques may be utilized in operation of the gyroscope. For example, appropriate techniques and devices may be utilized to prevent the gyroscope from drifting, and in particular, when less expensive gyroscopes are utilized. In accordance with one embodiment of the system and method of the invention, a filtering process may be utilized to effectively use data output by the gyroscope. For example, if a controller portion commands the robot to go straight and the wheels are experiencing slippage, the gyroscope will accurately inform the controller of rotation of the robot system 10. Accordingly, the gyroscope provides angular sensing and input, which is particularly useful when turning the robot.

It should be appreciated that the robot system 10 may utilize a docking system. A "home position" is provided at which the robot docks in the "docking position." When positioned in a docking position, the robot system 10 is electrically connected to a recharging source, for example. Accordingly, the robot system 10 may go out onto a floor of an area and work for a number of hours at which time the robot navigates its way back to the home position. At the home position, the robot system 10 self-docks itself so as to provide for replenishment. With respect to recharging the batteries, the recharging may, for example, be performed utilizing an inductive-type pickup wherein a plate is positioned in the floor; and the robot system 10 is positioned over that plate so as to provide for charging utilizing inductive techniques. Of course, a variety of other items may be replenished on the robot system 10 including cleaning solution, wax, water, as well as other exhaustible items.

In accordance with one embodiment of the method and system of the invention, a touch shield or lower shield may be provided. The touch shield provides feedback to the robot such that, if the robot bumps into something, or if something bumps into the robot, the robot can determine where the impact came from. For example, the impact may have come from the left, right, rear or front, for example. The touch shield is a physical element that surrounds a lower portion of the robot. The touch shield may be connected to the robot body using movement sensitive linkages, for example.

Method of Utilizing Robot System to Perform Function

In accordance with further embodiments of the invention, a method of utilizing a robot system to perform a function in an area is provided comprising the steps of first commanding the robot system to perform a function in an area, the area having an area layout including at least one area segment. The method further includes accessing by the robot system a stored map of the area layout, the stored map having at least one function task associated with the at least one area segment, localizing a first position of the robot system in the area, and determining a function path from the first position of the robot system for navigation of the area and completion of the at least one function task. Lastly, the method includes repeatedly continuously localizing a current position of the robot system while navigating the robot system along the function path, and completing the at least one function task that is associated with the current position of the robot system on the stored map of the area. An illustrative method of utilizing a robot system to perform a function in an area is shown in FIGS. 9–10, and described below.

Figure 9:
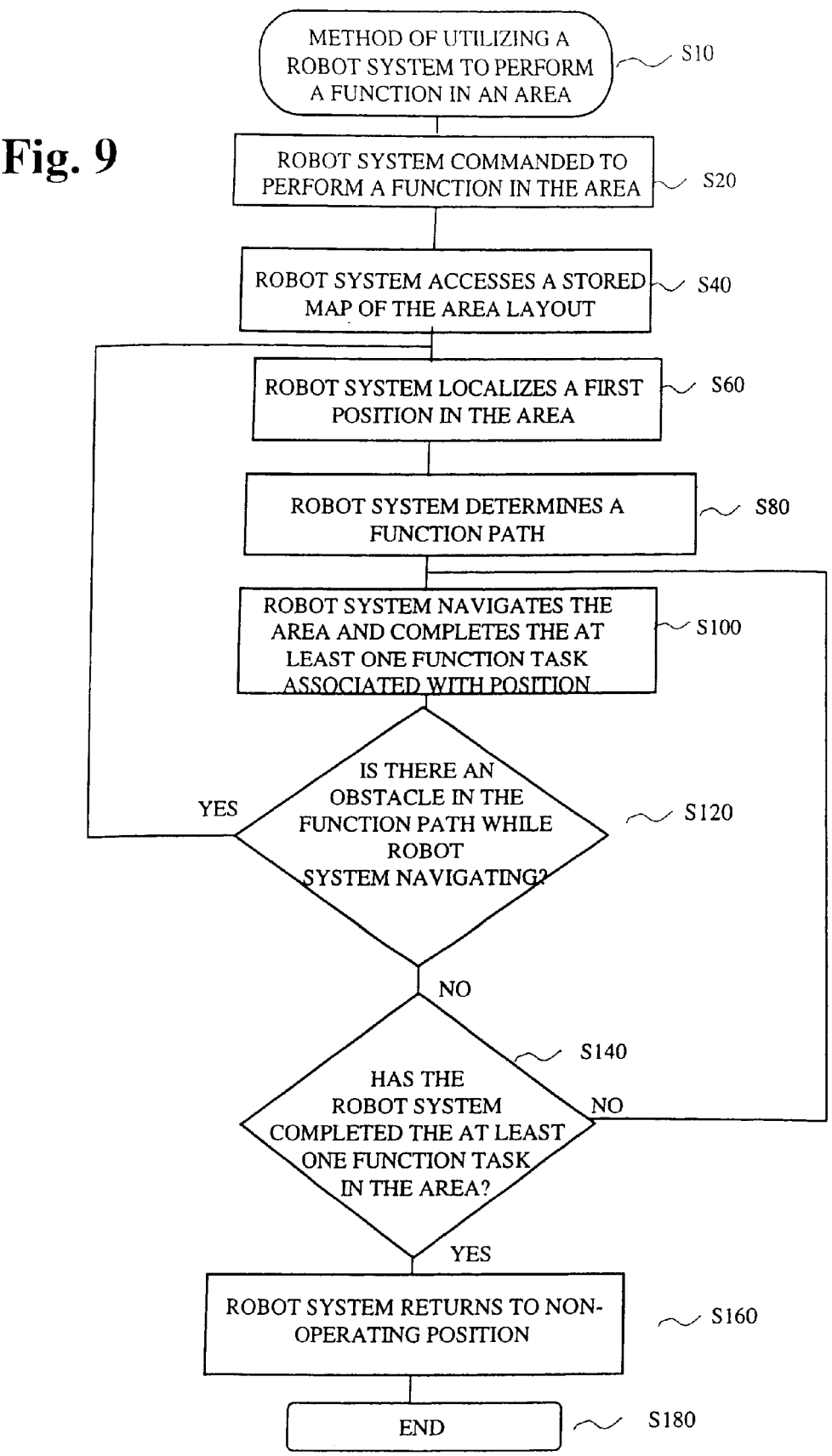
FIG. 9 is a flowchart showing a method of utilizing a robot system to perform a function in an area in accordance with an embodiment of the method and system of the invention.
Figure 10:
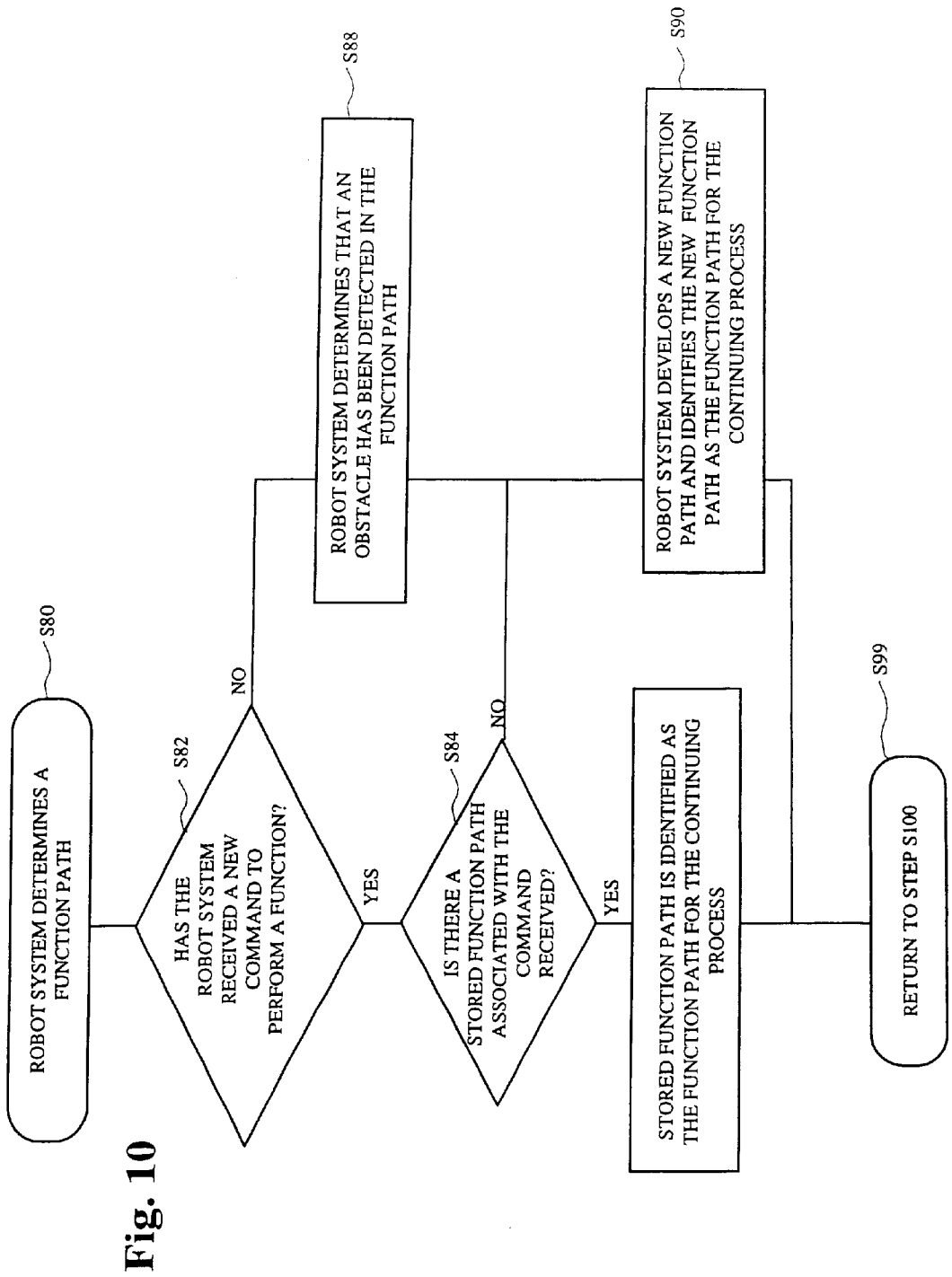
FIG. 10 is a flowchart showing the "robot system determines a function path" step of FIG. 9 in further detail in accordance with an embodiment of the method and system of the invention.

FIG. 9 is a flowchart showing a method of utilizing a robot system to perform a function in an area in accordance with an embodiment of the method and system of the invention. The process begins in step S10, and then passes to step S20, wherein the robot system is commanded to perform a function in an area. The function has at least one function task, while the area has an area layout which includes at least one area segment. Then, once the robot system has received a command to perform a function in an area, the robot system accesses a stored map of the area layout in step S40. The area layout has at least one function task associated with its at least one area segment. In step S60, the robot system localizes a first position in the area. Once the first position is determined, in step S80, the robot system determines a function path, from the first position, for navigation of the area and completion of the at least one function task. Then, in step S100, the robot system navigates the area and completes the at least one function task associated with the position of the robot system in the area, while continuously localizing the robot system position in the area. In addition, while the robot system is navigating the area and completing the at least one function task, the robot system is continuously monitoring for obstacles, and determining if an obstacle is in the function path in step S120. If an obstacle is detected in the function path, the process returns to step S60, where the robot system will once again localize a position (in step S60) and recalculate a new function path that avoids the obstacle in the current function path (in step S80).

Alternatively, if the robot system does not detect an obstacle in the function path (in step S120), the process passes to step S140, wherein the robot system determines if it has completed the at least one function task in the area. If yes, the process passes to step S160 wherein the robot system returns to a non-operating position. Then, the process ends in step S180. However, if the robot system has not completed its at least one function task in step S160, the process returns to step S100 and the robot system continues to navigate the area and complete its at least one function task. The process may be further understood by examining FIG. 10, which shows the method of FIG. 9 in further detail.

It should be appreciated that if the robot system is not in the area when it receives the command to perform a function, the robot system moves to the area. For example, the robot system may take appropriate measures to guide itself to the area, or the robot system may be directed to the area by an operator.

FIG. 10 is a flowchart showing the "robot system determines a function path" step of FIG. 9 in further detail in accordance with an embodiment of the method and system of the invention. The process begins in step S80, and then passes to step S82. In step S82, the robot system determines whether it has received a new command to perform a function. If the robot system has received a new command, the process passes to step S84, where the robot system determines if there is a stored function path associated with the command received. This may include a previously determined function path for a given area based on layout of the area and associated tasks. If a stored function path exists that is associated with the new command received, the process passes to step S86. In step S86, the stored function path is identified as the function path for the continuing process. The, the process passes to step S99, wherein the process returns to step S100.

Alternatively, if in step S82, the robot system determines that it has not received a new command, the process passes to step S88. Then, in step S88, the robot system determines that an obstacle has been detected in the current function path. The process then passes to step S90, where the robot system develops a new function path and identifies the new function path as the function path for the continuing process. Then, the process passes to step S99, wherein the process returns to step S100.

In step S84, if the robot system determines that there is no stored function path associated with the command received, the process passes to step S90. Then, in step S90, the robot system develops a new function path and identifies the new function path as the function path for the continuing process. Thereafter, the process passes to step S99, wherein the process returns to step S100.

It should also be appreciated that a stored function path for a given area segment in an area layout may be more efficient than a function path determined by a robot system operating of information gathered from sensors. This may occur because pre-programmed function paths may allow an operator to direct the robot system very close to obstacles, such as walls, and guide the robot system into tight spaces that the robot system's obstacle avoidance systems would otherwise not allow the robot system to navigate within.

As stated above, the robot system may create updated maps of the area layout when obstacles are detected in the area layout. Once detected, the obstacles can be added to an amended map of the area layout that can be utilized. Also, if the obstacle is removed, the robot system can either create another amended map that removes the obstacle, or could return to the previous stored map. It should also be appreciated that the operator may set the updating of a stored map to occur on the detection of an obstacle for a given number of consecutive cleaning cycles through a given area layout. The number of repeated detections of an obstacle before it is added to a map of the area layout can be determined by one of ordinary skill in the art based upon the needs of the given area layout.

Figure 11:
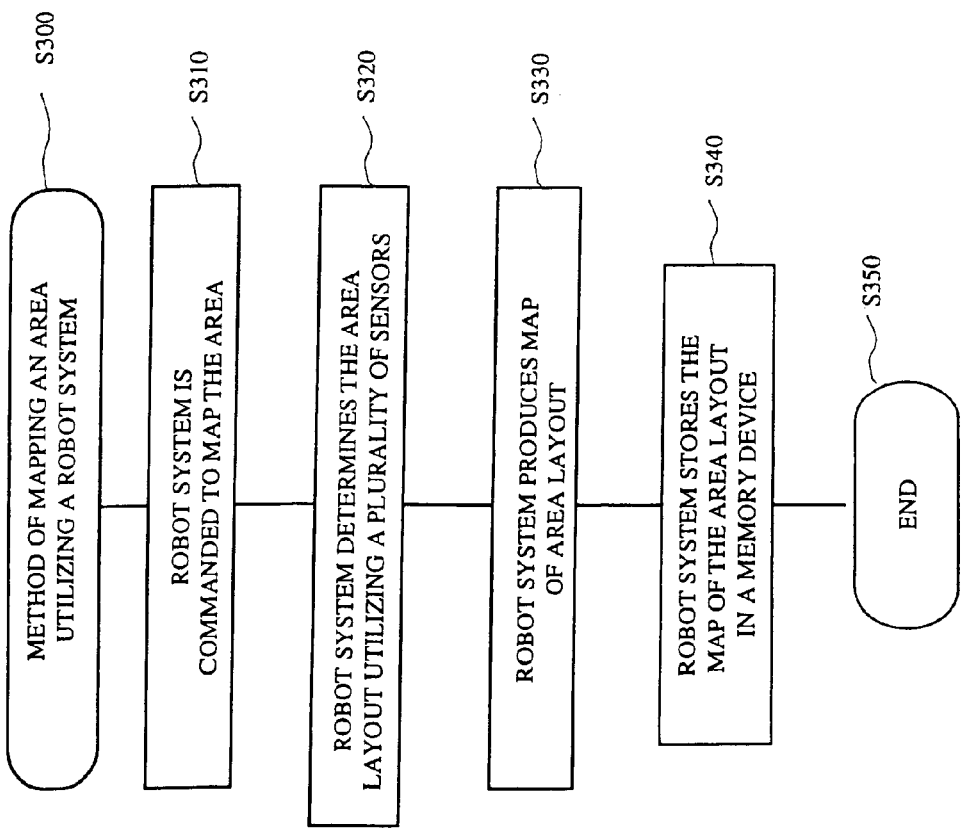
FIG. 11 is a flowchart showing a method of mapping an area utilizing a robot system in accordance with one embodiment of the method and system of the invention.
Figure 12:
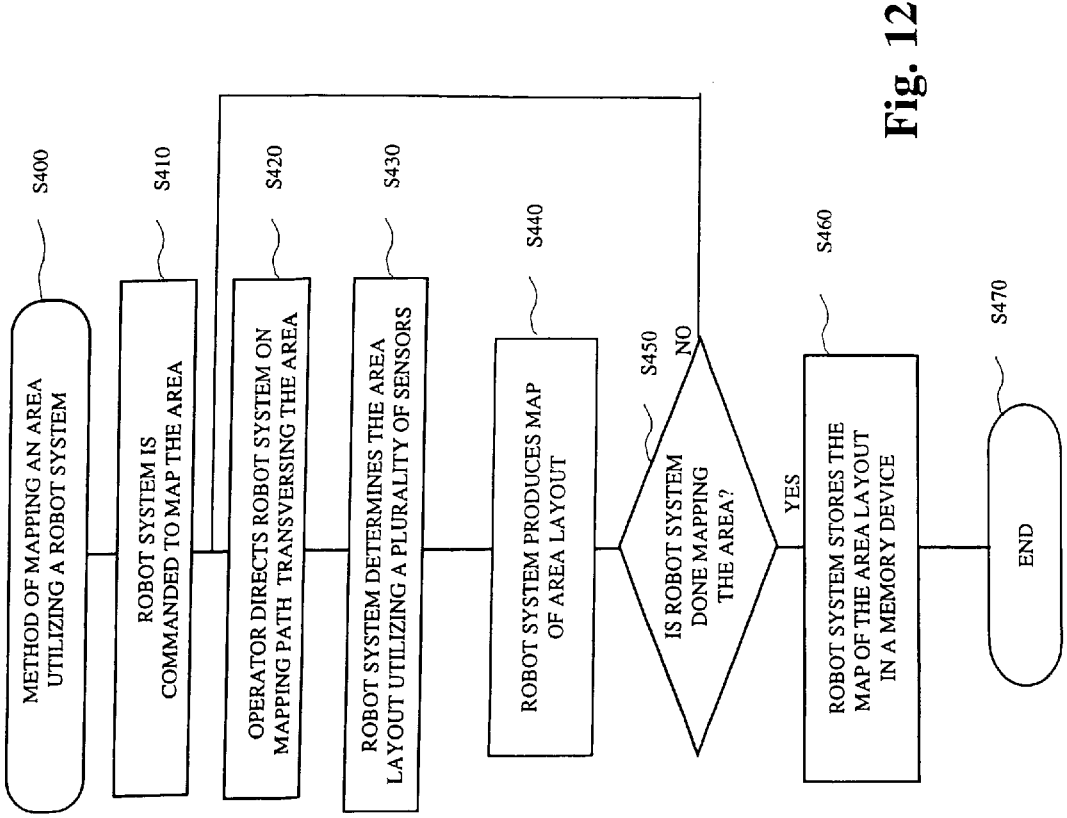
FIG. 12 is a flowchart showing a method of mapping an area utilizing a robot system in accordance with yet another embodiment of the method and system of the invention.
Figure 13:
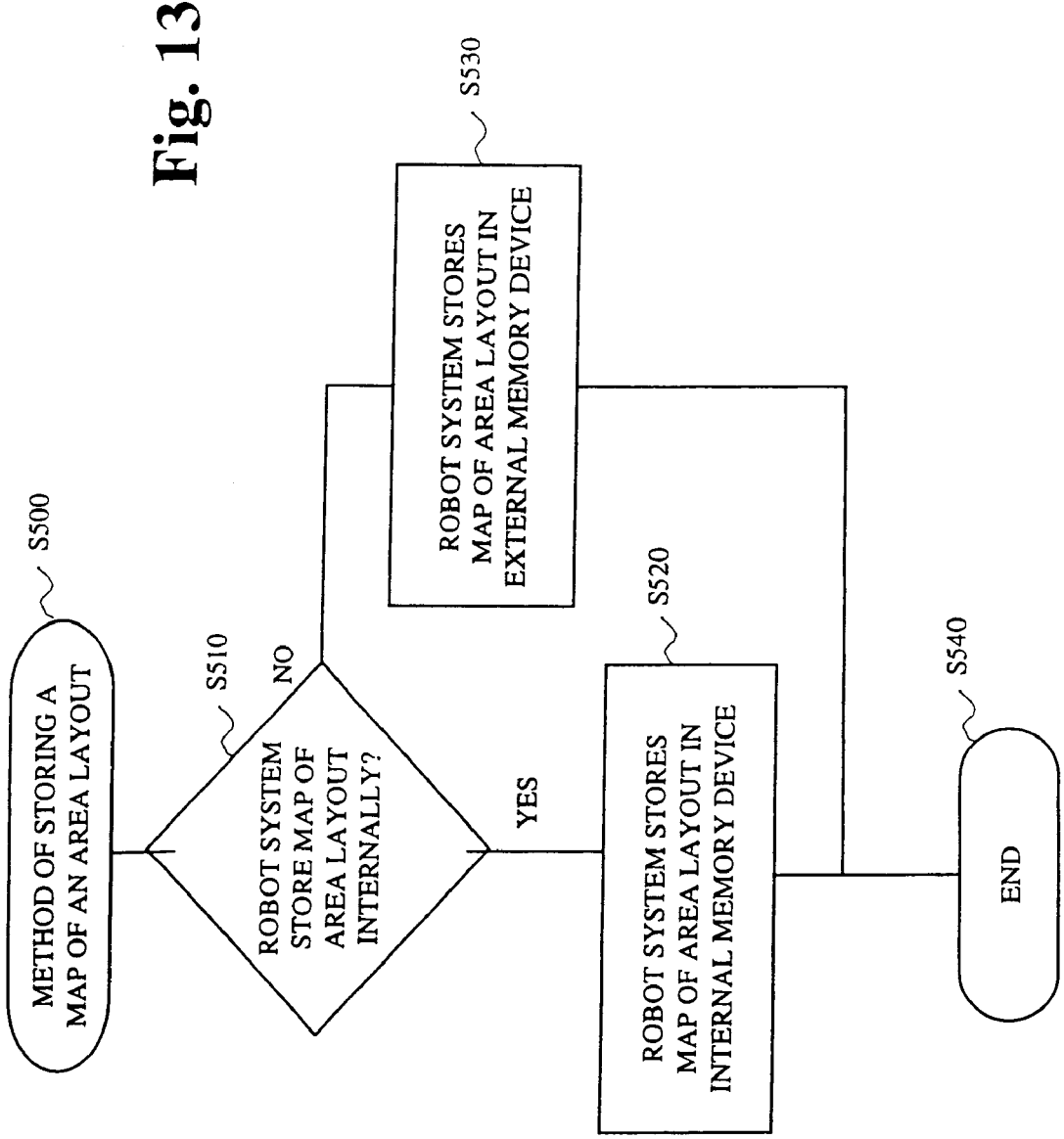
FIG. 13 is a flowchart showing a method of storing a map of an area layout in accordance with one embodiment of the system and method of the invention.

To provide a better understanding of the method of utilizing a robot system to perform a function in an area, FIGS. 11–13 are illustrative flowcharts showing a method of mapping an area and assigning function tasks to an area segment in accordance with one embodiment of the method and system of the invention.

FIG. 11 is a flowchart showing a method of mapping an area utilizing a robot system in accordance with one embodiment of the method and system of the invention. The process begins in step S300, and then passes to step S310. Then, in step S310, the robot system is commanded to map an area. The area has an area layout which includes at least one area segment. Once the robot system receives the command to map an area, in step S320, the robot system determines the area layout utilizing a plurality of sensors. Accordingly, the robot system produces a map of the area layout in step S330, and stores the map of the area layout in a memory device in step S340. The process then passes to step S350.

Similarly, FIG. 12 is a flowchart showing a method of mapping an area utilizing a robot system in accordance with yet another embodiment of the method and system of the invention. The process begins in step S400, and then passes to step S410. Then, in step S410, the robot system is commanded to map an area. The area has an area layout which includes at least one area segment. Once the robot system receives the command to map an area, in step S420, an operator directs the robot system on a mapping path that transverses the area being mapped. Then, in step S430, while moving along the path transversing the area being mapped, the robot system determines the area layout utilizing a plurality of sensors. Accordingly, the robot system produces a map of the area layout in step S440. Then, in step S450, the robot system determines whether or not the entire area has been mapped. If not, the process returns to step S420 to continue mapping. However, if the entire area has been mapped, the robot system stores the map of the area layout in a memory device in step S460. The process then passes to step S470, where it ends.

As stated above, both illustrative embodiments of mapping processes shown in FIGS. 11 and 12 store the completed map of an area layout in a suitable memory device. FIG. 13 is a flowchart showing a method of storing a map of an area layout in accordance with one embodiment of the system and method of the invention. For example, the process shown in FIG. 13 may represent the steps of S340 and S460, of FIGS. 11 and 12 respectively, in further detail.

The illustrative storing process shown in FIG. 13 begins in step S500, and then passes to step S510. In step S510, the robot system determines whether to store the map of the area layout in an internal memory device. If yes, the robot system stores the map of the area layout in an internal memory device in step S520. Alternatively, if the robot system determines not to store the map of the are layout internally, the robot system stores the map in an external memory device in step S530. Once the map of the area layout has been stored in steps S520 and S530, the processes pass to step S540, wherein the processes end. It should be appreciated that these illustrative storing processes may be utilized in conjunction with other processes in which other steps may be added or deleted.

It should be appreciated that the operator may direct the robot system along a mapping path that transverses the area being mapped in any suitable manner in which the robot system receives a command from an operator to move from one point to another. For example, an operator may physically guide the robot system from a first point in an area segment to a finishing point of the mapping. In addition, the operator may control the movement of the robot system through the use of a wireless keyboard or joystick. Furthermore, any suitable mapping path that allows the robot system to produce a complete map of an area segment may be utilized. Therefore, as stated above, the robot system need only transverse the area being mapped to the extent necessary for mapping the area. It should be appreciated that the robot system may not need to physically move in any respect to produce a map of an area.

Furthermore, the robot system performing the mapping of an area may utilize a plurality of different sensors in producing the map. Once the map is complete, the map may be stored in any suitable memory device. This may include an internal memory store within the robot system, or any external memory device in which the robot system is in communication, or both, for example. Accordingly, the robot system may store the completed map in a central memory device, wherein the map is accessible by one or more alternate robot systems. The alternate robot systems may employ their access to the stored map upon receiving a command to perform a function in an area associated with the stored map.

Figure 14:
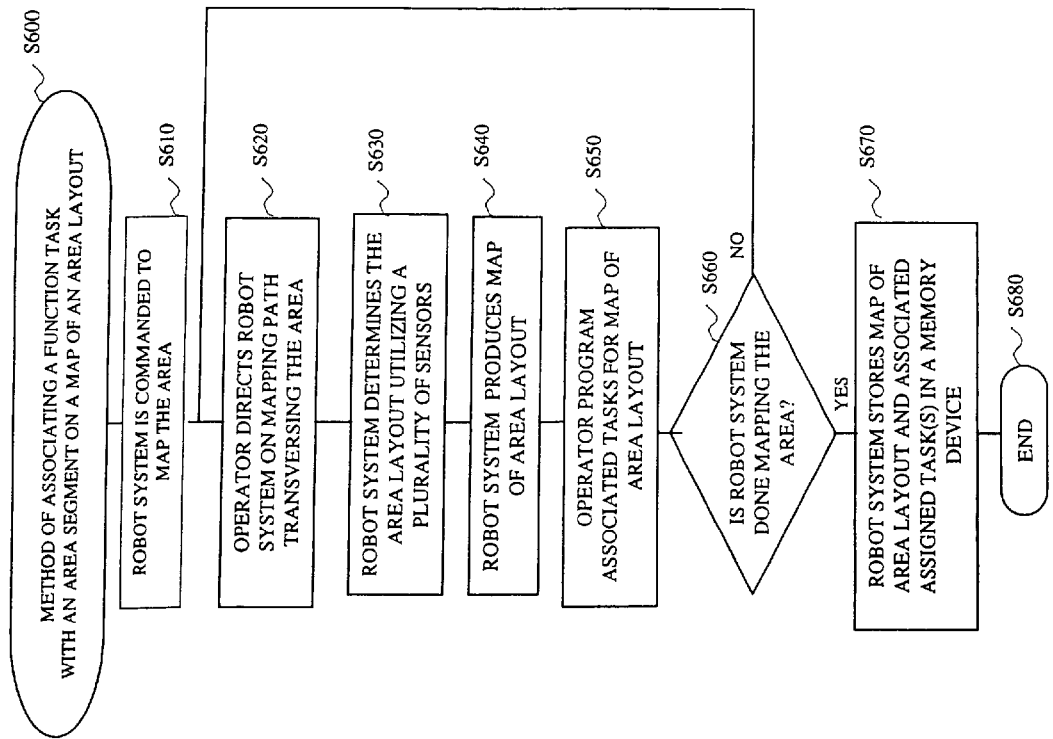
FIG. 14 is a flowchart showing a method of associating a function task with an area segment on a map of an area layout in accordance with yet another embodiment of the method and system of the invention.

Furthermore, along with the mapping of an area, and its accompanying area layouts, in accordance with one embodiment of the method and system of the invention, an operator may assign, program, or associate function tasks for a given area segment. Accordingly, an operator could map an area segment and assign one function task to be completed in that area segment once the robot system receives a command to perform a function in the area, for example. FIG. 14 provides a better understanding of how function tasks can be associated with maps of area layouts.

FIG. 14 is a flowchart showing a method of associating a function task with an area segment on a map of an area layout in accordance with yet another embodiment of the method and system of the invention. The process begins in step S600, and then passes to step S610. Then, in step S610, the robot system is commanded to map an area. The area has an area layout which includes at least one area segment. Once the robot system receives the command to map an area, in step S620, an operator directs the robot system on a mapping path that transverses the area being mapped. Then, in step S630, while moving along the path transversing the area being mapped, the robot system determines the area layout utilizing a plurality of sensors. Accordingly, the robot system produces a map of the area layout in step S640. The process then passes to step S650, wherein an operator associates at least one function task to be completed in the area segment with the map of the area layout, which includes the area segment. Then, in step S660, the robot system determines whether or not the entire area has been mapped. If not, the process returns to step S620 to continue mapping. However, if the entire area has been mapped, the robot system stores the map of the area layout and the at least one function task associated with the at least one area segment in a memory device in step S670. The process then passes to step S680, where it ends.

As stated above, it should be appreciated that the assignment of function tasks to given area segments throughout an area can be accomplished in any suitable manner and in any desired combination. For instance, an operator may associate a certain function task to an area segment before the robot system begins to map the area segment. In this example, an operator could command the robot to map the area, the robot begins sensing the area layout and the operator programs a function task to go along with the area segment before the robot system begins to transverse the area. Simply, the operator could press a record button, which tells the robot system to map the area, then push a function task button, which tells the robot to associate the function task with the area segment. The operator could then direct the robot system over the area segment and map and assign tasks simultaneously.

In addition, an operator may choose to associate several function tasks with one area segment and only one for another. However, in one embodiment of the invention, when the robot system determines the function tasks it will perform based on a stored map and associated tasks, each area segment should have at least one function task. This one function task may be as simple as moving through the area segment and not performing any other function task. In this respect, one of ordinary skill in the art could prepare several different stored functions within the robot system, which include several commands, functions, area layouts further including numerous area segments, for example. This embodiment of the invention may be further understood with reference to FIG. 15.

Figure 15:
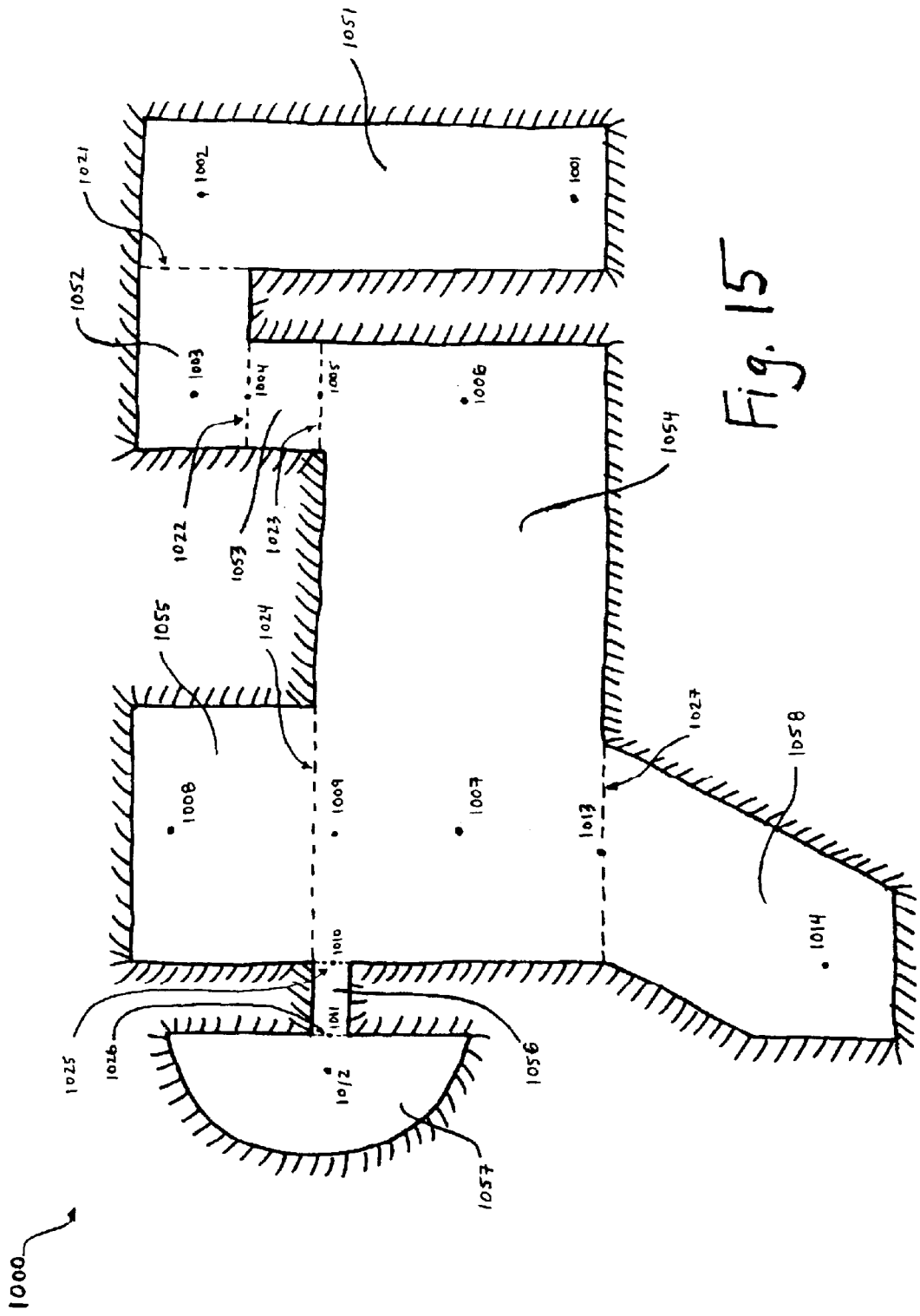
FIG. 15 is a diagram of an illustrative area layout in accordance with one embodiment of the method and system of the invention.

Illustratively, FIG. 15 is a diagram of an illustrative area layout in accordance with one embodiment of the method and system of the invention. In this example, the robot system is first placed in an unmapped area 1000 at point 1001. An operator then commands the robot system to begin mapping the area layout in which the robot system is placed. The robot system begins sensing the boundaries, i.e. walls, of the area layout and then moves to point 1002, while continuously sensing. Once at point 1002, the robot system produces a map of the first area segment 1051, which is defined by the walls where the robot system first began sensing at point 1001, and artificial boundary 1021, which is the programmed boundary between area segments 1051 and 1052. Accordingly, the operator or programmer can assign any number of function tasks for completion in this area segment 1051, the least of which is to travel through it. Continuing with this embodiment of the invention, the operator then directs the robot system from point 1002 to point 1003. The robot system continues sensing and updating a map of the area layout based on the movement, while recognizing the established boundary 1021 between area segments 1051 and 1052. In addition, area segment 1052 is defined by the walls of the area and space between boundary 1021 and boundary 1022, the boundary between area segments 1052 and 1053. The mapping process may continue accordingly through mapping passes from points 1003–1014. However, for this example, the robot system will move from point 1003 to 1004 to 1005 to 1006 to 1007 to 1008, back to 1009 to 1010 to 1011 to 1012 back to 1009 to 1013 and finishing with point 1014. In this respect, the mapping process can map the entire area layout 1000, while dividing the area layout 1000 into area segments 1051, 1052, 1053, 1054, 1055, 1056, 1057, and 1058, separated by artificial boundaries 1021, 1022, 1023, 1024, 1025, 1026 and 1027, as shown in FIG. 15.

As stated above, the operator possesses a wide range of latitude in determining which function tasks may be assigned to each area segment. In FIG. 15, the operator may program than area segments 1051 and 1052 should be mopped and dried, area segment 1053 should be passed over because it is carpeted (unless vacuuming desired), area segments 1054 and 1055 should be scrubbed, mopped, dried and waxed, area segment 1056 should be passed over because it is carpeted, area segment 1057 vacuumed, and area segment 1058 swept. As described in the above description of FIG. 15, the robot systems commands may require it to travel over the same section of the area layout several times, perform function and tasks repeatedly on one area segment, and in any various order or schedule. Therefore, one should appreciate that many different combinations of function tasks and area segments can be accomplished based upon the desired programming input into the robot system by the operator.

Furthermore, several functions may be tailored to very specific activities that can recur daily, weekly or monthly. However, once in operation, the robot system understands the function tasks it is to perform in different area segments based upon the stored map associated with the commanded function, and tasks assigned to area segments stored along with the map of the area layout.

Additionally, it should be appreciated that any stored map of an area may be edited or amended once produced. Illustratively, FIGS. 16 and 17 show illustrative methods of editing a map of an area layout in accordance with further embodiments of the method and system of the invention.

Figure 16:
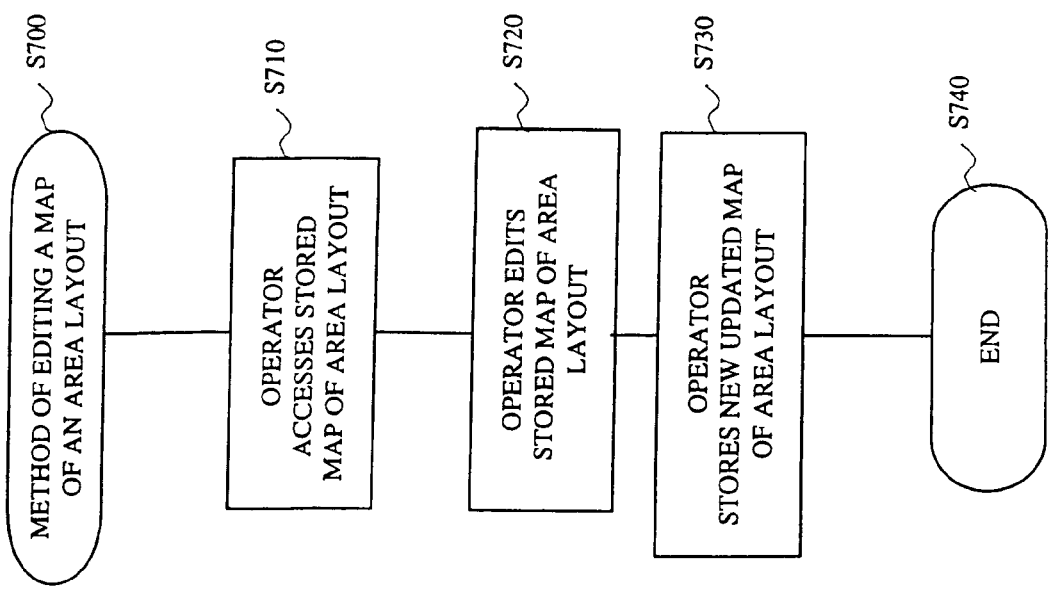
FIG. 16 is a flowchart showing a method of editing a map of an area layout in accordance with one embodiment of the system and method of the invention.

FIG. 16 is a flowchart showing a method of editing a map of an area layout in accordance with one embodiment of the system and method of the invention. The process begins in step S700, and then passes to step S710. In step S710, an operator accesses a map of an area layout. In step S720, the operator edits the map of the area layout. Once the map of the area layout has been edited, the operator stores the edited map of the area layout in a memory device, in step S730. The process then passes to step S740 where it ends. As stated above, the robot system may be programmed to create updated maps of area layouts in which the robot system is operating within based upon the detection of obstacles in the function path, for example. This may include commanding the robot system to create an amended map upon the repeated detection of an obstacle.

It should be appreciated that not only can the map of the area layout be edited, amended or modified, but the programmed tasks associated with given area segments may also be edited or changed. Illustratively, FIG. 17 is provided.

Figure 17:
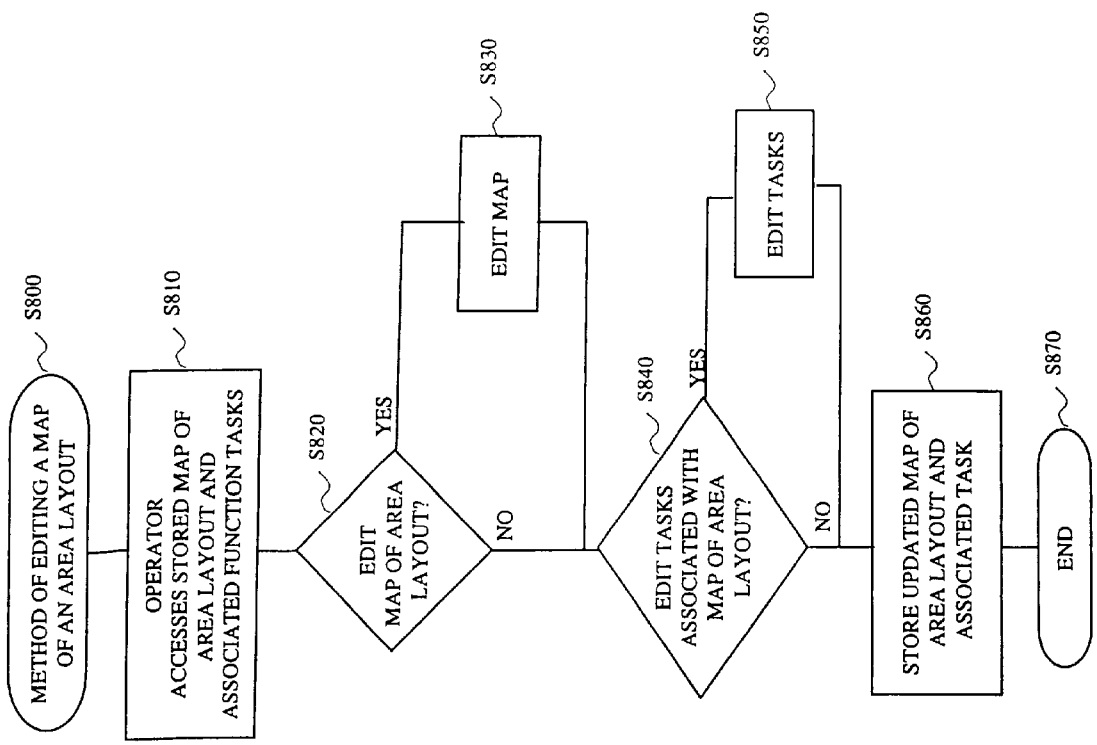
FIG. 17 is a flowchart showing a method of editing a map of an area layout in accordance with a further embodiment of the method and system of the invention.

FIG. 17 is a flowchart showing a method of editing a map of an area layout in accordance with a further embodiment of the method and system of the invention. The process begins in step S800, and then passes to step S810 an operator accesses a map of an area layout and function tasks that have been associated with the area layout. Then, in step S820, the operator determines whether or not to edit the map of the accessed area layout. If yes, the process passes to step S830, in which the operator edits the accessed map of the area layout. Once the map has been edited, the process passes to step S840. Alternatively, if in step S820, the operator decides not to edit the accessed map of the area layout, the process passes to step S840.

In step S840, the operator determines whether or not to edit the function task(s) associated with any area segment in the map of the area layout. In this respect, function tasks can be added or deleted. If yes, the process passes to step S850, in which the operator edits or changes the associated function task(s). Then, the process passes to step S860. Alternatively, if in step S840, the operator chooses not to edit the associated function task(s), the process passes to step S860. Then, in step S860, the operator stores the edited map of the area layout or edited associated function task(s) or both in a memory device. The process then passes to step S870 where it ends.

Figure 18B:
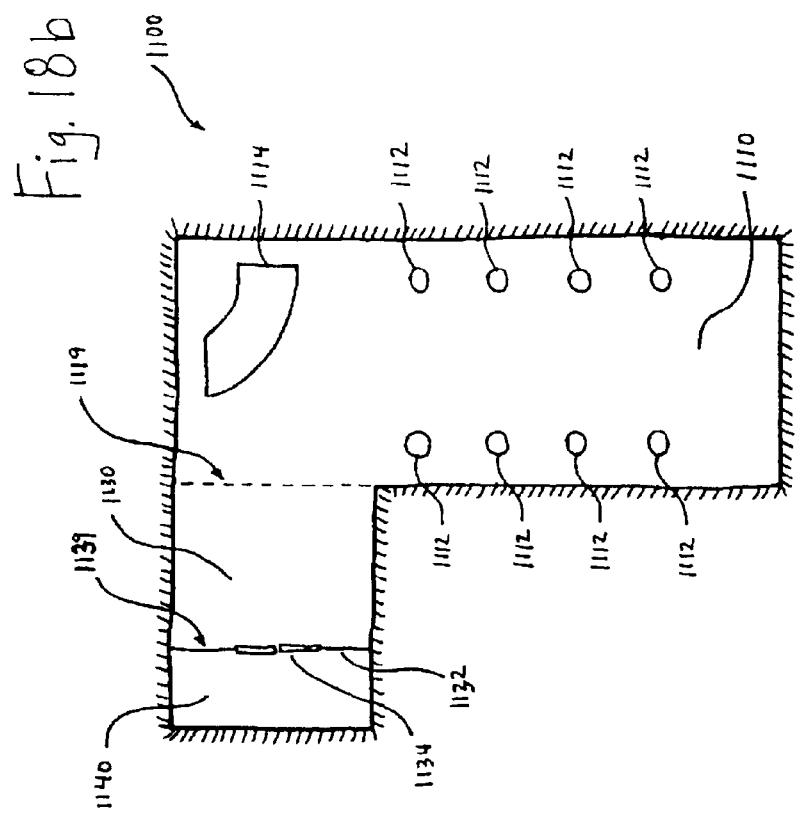
FIG. 18b is a diagram of an edited area layout in accordance with one embodiment of the method and system of the invention.
Figure 18A:
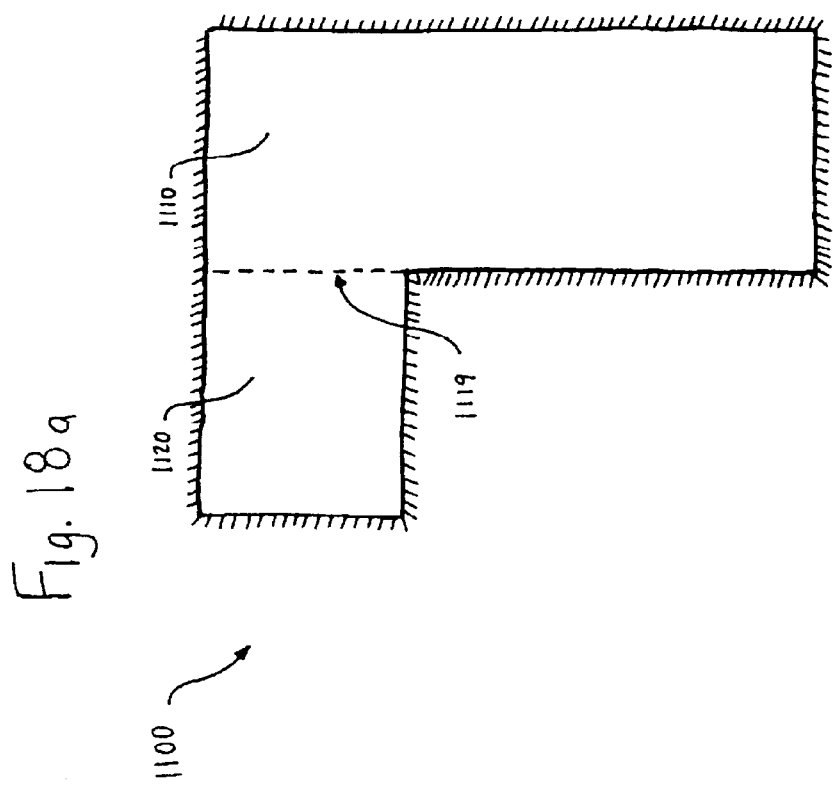
FIG. 18a is a diagram of an unedited area layout in accordance with one embodiment of the method and system of the invention.

One embodiment of an editing process may be further understood by reference to FIGS. 18*a* and 18*b*. FIG. 18*a* is a diagram of an unedited area layout 1100 in accordance with one embodiment of the method and system of the invention. As shown in FIG. 18*a*, area layout 1100 is divided into a first area segment 1110 and second area segment 1120, which are separated by artificial boundary 1119. For purposes of this example, consider area layout 1110 to represent a tiled floor area of an office building. However, if changes to the area of the office building are made, an operator can edit the map of this area layout 1100.

FIG. 18*b* is a diagram of an edited area layout in accordance with one embodiment of the method and system of the invention. As shown in FIG. 18*b*, the same area layout 1100 is now subdivided into area segments 1110, 1130 and 1140, separated by boundaries 1119 and 1139, respectively. It should be appreciated that 1130 and 1140 make up what was 1120. In this example, the office building area has been modified to add multiple pillars 1112 in area segment 1110, a receptionist desk 1114 in area segment 1110, and a glass wall 1132 with glass double doors 1134 has been placed on boundary 1139. Accordingly, an operator can edit the original stored map of area layout 1100 (as shown in FIG. 18*a*) to include these new features (as shown in FIG. 18*b*) and update a function for a robot system to perform in this area layout 1100.

Figure 19B:
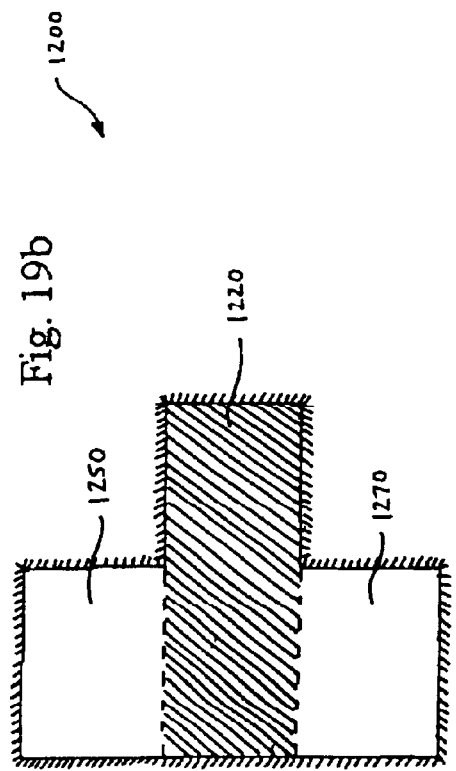
FIG. 19b is a diagram of the illustrative area layout of FIG. 19a in further detail in accordance with one embodiment of the method and system of the invention.
Figure 19D:
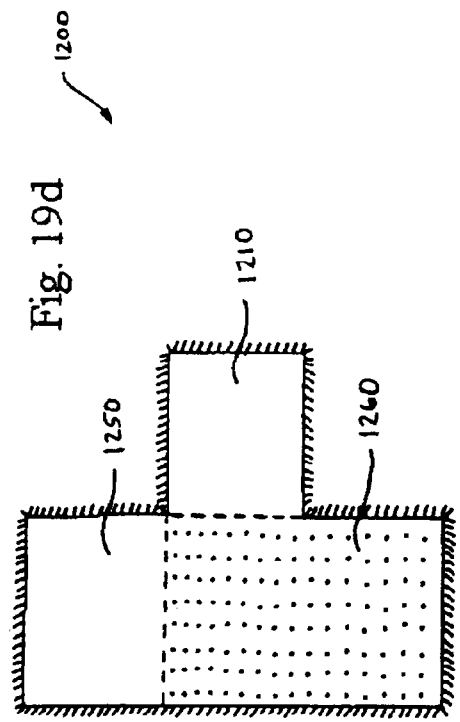
FIG. 19d is a diagram of the illustrative area layout of FIG. 19a in further detail in accordance with one embodiment of the method and system of the invention.
Figure 19A:
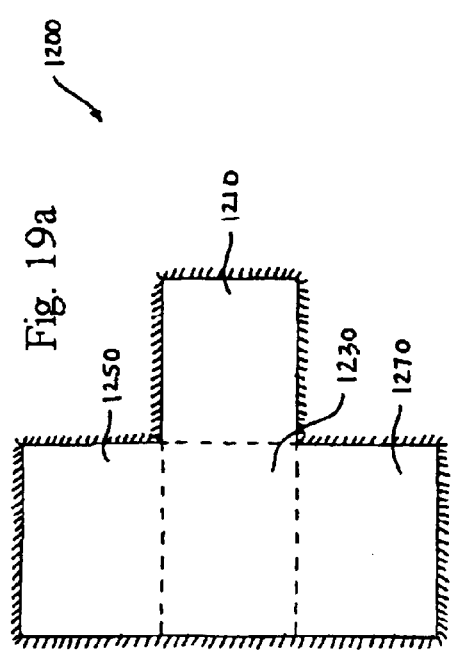
FIG. 19a is a diagram of an illustrative area layout in accordance with one embodiment of the method and system of the invention.
Figure 19C:
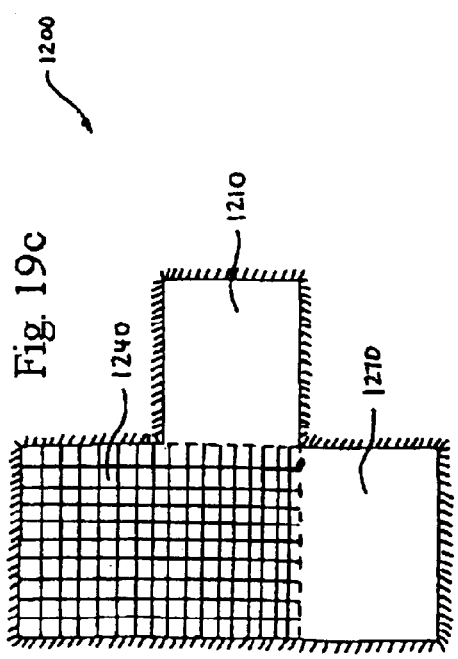
FIG. 19c is a diagram of the illustrative area layout of FIG. 19a in further detail in accordance with one embodiment of the method and system of the invention.

Further methods of controlling an illustrative robot system in accordance with further embodiments of the system and methods of the invention may be understood with reference to FIGS. 19*a*, 19*b*, 19*c* and 19*d*. FIG. 19*a* is a diagram of an illustrative area layout in accordance with one embodiment of the method and system of the invention. FIGS. 19*b*, 19*c* and 19*d* are diagrams of the illustrative area layout of FIG. 19*a* in further detail in accordance with one embodiment of the method and system of the invention. As shown in FIG. 19*a*, illustrative area layout 1200 is provided. Area layout 1200 is divided into sections 1210, 1230, 1250 and 1270, respectively, for purposes of this embodiment. As shown in FIG. 19*b*, sections 1210 and 1230 can be grouped together to define area segment 1220. As shown in FIG. 19*c*, sections 1230 and 1250 can be grouped together to define area segment 1240. As shown in FIG. 19*d*, sections 1230 and 1270 can be grouped together to define area segment 1260.

It should be appreciated that the above described sections and area segments, as shown in FIGS. 19*a*–19*d*, have been selected only for purposes of illustrating one embodiment of the system and method of the invention. An operator may define different area segments throughout an area layout in any suitable manner desired for accomplishing the desired function. For example, if a small circular area rug was placed in the center of section 1230, the operator could choose to make that portion of section 1230 covered by the area rug to define yet another area segment.

Moreover, an operator can utilize several different commands for directing the robot system's functioning within differing area segments. For example, the operator can program the robot system to change area segments with a simple programmed turn of the robot system. In this respect, once the robot system would finish performing a task within one area segment, the routine could include a programmed 90 degree turn clockwise, after which the robot system would be in the next area segment. The robot system would then move to the tasks commanded for the second area segment upon making the turn. The following example further illustrates these and other features.

In one embodiment, based on area layout 1200, an operator commands a cleaning robot system to perform several different cleaning tasks within area layout 1200. Utilizing the stored map of area layout 1200, the operator can dictate a series of tasks to be completed. In this embodiment, area layout 1200 is divided into area segments 1220, 1240 and 1260, respectively. It should be appreciated, as shown in FIGS. 19*a*–19*d,* area segments may overlap and may further be defined in any suitable manner desired.

Accordingly, the series of tasks in this embodiment may be scripted such that the robot system first applies cleaning solution to and then mops area segment 1220. Then, the robot system applies cleaning solution to, scrubs and then mops area segment 1240. Finally, the robot system simply dust mops area segment 1260. Although these area segments overlap and are not separated by physical boundaries, the operator may change the area segment in which the robot system is operating by commanding the robot system to turn upon the completion of the assigned tasks for an area segment. Thus, once the robot system finished mopping area segment 1220, and was situated in section 1230, a 90 degree clockwise turn could place the robot system in the next area segment. Therefore, upon the 90 degree turn, the robot system would be at its initial operating point for area segment 1240. However, it should be understood that turns and other physical movements of the robot system may be utilized to effectuate the robot system's assigned tasks, and the differentiation between area segments in an area.

It should be appreciated that commands may be received from a central system via any suitable communication interface, modem, telephone, fax, or other computer connection, the receipt of data input from an IP address given to the robot, or any other suitable connection through which the robot's processor might receive input from an external source. In addition, a robot system may receive a command from another robot to perform a function or function task. As such, if a fleet of robots were deployed in an area, and one robot was given a function or function task that it could not address at that time, the robot could send a command to another robot, through any suitable interface, to perform the necessary function or task. Accordingly, an illustrative fleet of robots may take commands from a manager robot dispatching commands through interfaces with the other robots in the area.

It should further be appreciated that the robot system's ability to perform functions in an area may extend to those periods of time when no operators are present to supervise the robot system. As such, the robot system could perform a maintenance and security function, as well as a conventional cleaning function. In addition, the robot may be programmed to handle certain emergency situations, including for example, fire emergencies, burglaries or loss of power in the area in which it is operating. It should be appreciated that once the robot system detects an emergency condition, the robot system may alert all necessary personnel to the emergency condition.

It should be further understood that in accordance with the robot system's ability to operate autonomously the robot will be provided with the necessary programming, tasking and commands to ensure its readiness to perform functions in an area. This may require that the robot system monitor its own diagnostic system, including its power status and internal components, such that the robot system would understand if it needs to be recharged or serviced to maintain its working condition. Then, the robot system may alert the necessary personnel that it needs service. For simple service requirements, like the recharging of the robot system's batteries, dumping or refilling tanks, the robot system may deliver itself to a recharging station where it can autonomously recharge its batteries, and dump or refill its tanks.

Referring now to the above-described FIGS. 9–19, and the illustrative examples in accordance with the method and system of the invention, it should be appreciated that the steps in the utilization of the robot system to perform a function in an area may be accomplished in several manners. For example, As described above, one embodiment of the processing system of the invention as shown in FIGS. 1–8 is in the form of a computer or computer system. As used herein, the term "computer system" is to be understood to include at least one processor utilizing a memory or memories. The memory stores at least portions of an executable program code at one time or another during operation of the processor. Additionally, the processor executes various instructions included in that executable program code. An executable program code means a program in machine language or other language that is able to run in a particular computer system environment to perform a particular task. The executable program code process data in response to commands by a user. As used herein, it will be appreciated that the term "executable program code" and term "software" mean substantially the same thing for the purposes of the description as used herein.

Further, it is to be appreciated that to practice the system and method of the invention, it is not necessary that the processor, or subportions of the processor, and/or the memory, or subportions of the memory be physically located in the same place or disposed in the same physical portion of the robot system 10. That is, it should be appreciated that each of the processor and the memory may be located in geographically distinct locations and connected so as to communicate in any suitable manner, such as over a wireless communication path, for example. Additionally, it should be appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, each respective portion of the memory described above may include two or more portions of memory in two or more physical locations. Further, the memory could include or utilize memory stores from the Internet, Intranet, Extranet, LAN or some other source or over some other network, as may be necessary or desired.

As described above, the invention may illustratively be embodied in the form of a computer or computer operating system. It is to be appreciated that the software that enables the computer operating system to perform the operations described above may be supplied on any of a wide variety of data holding media. Further, it should be appreciated that the implementation and operation of the invention may be in the form of computer code written in any suitable programming language, which provide instructions to the computer.

It should further be appreciated that the software code or programming language that is utilized in a computer system to perform the various operations of the above described invention may be provided in any of a wide variety of forms. Illustratively, the software may be provided in the form of machine language, assembly code, object code, or source language, as well as in other forms. Further, the software may be in the form of compressed or encrypted data utilizing an encryption algorithm.

Additionally, it should be appreciated that the particular medium utilized may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention, which is utilized in operation of the robot system 10, may be provided in the form of a hard disk or be transmitted in some form using a direct wireless telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module of a program that is designed to handle, or a portion of a module of a program, for example. As noted above, it should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, in the system and method of the invention, a variety of user interfaces are utilized. A user interface may be in the form of a dialogue screen for example. As used herein, a user interface includes any software, hardware or combination of hardware and software used in an operating system that allows a user to interact with the operating system. A user interface may include any of a touch screen, keyboard, mouse, voice reader, voice recognizer, dialogue screen, menu box, a list, a checkbox, a toggle switch, a pushbutton or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

A user interface is utilized by an operating system running an application program to process data for a user. As should be appreciated, a user interface is typically used by a computer for interacting with a user either to convey information or receive information. However, it should be appreciated that in accordance with the system and method of the invention, it is not necessary that a human user actually interact with a user interface generated by the operating system of the invention. Rather, it is contemplated that the user interface of the invention interact, i.e., convey and receive information, in communication with another operating system or computer, rather than a human user. Further, it is contemplated that the user interfaces utilized in the system and method of the invention may interact partially with another operating system while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A method of utilizing a robot system comprising the steps of:

commanding the robot system to perform a function in an area, the function having at least one function task, the area having an area layout including at least one area segment;

accessing by the robot system a stored map of the area layout, the stored map having at least one function task associated with the at least one area segment;

localizing a first position of the robot system in the area;

determining a function path by the robot system from the first position of the robot system for navigation of the area and completion of the at least one function task;

repeatedly continuously localizing a current position of the robot system while navigating the robot system along the function path; and completing the at least one function task that is associated with the current position of the robot system on the stored map of the area.

2. The method of claim 1 further including the step of repeatedly continuously monitoring by the robot system for obstacles in the function path.

3. The method of claim 2 further including the step of updating the function path upon the detection of an obstacle in the function path.

4. The method of claim 1 where the stored map is edited by the robot system upon the detection of an obstacle in the function path to represent the obstacle in an edited map of the area layout.

5. The method of claim 1 wherein the function is edited by adding or deleting at least one function task such that the function has at least one function task.

6. The method of claim 1 wherein the function is a cleaning function, the cleaning function having at least one cleaning task.

7. The method of claim 6 wherein the cleaning function includes at least one of rinsing, wringing, flushing, wiping, mopping, dust mopping, sponging, scouring, abrading, grinding, leveling, swabbing, scrubbing, scraping, stripping, sanding, brushing, washing, drying, laving, laundering, applying detergent to, applying abrasive to, clearing, disinfecting, irradiating, deodorizing, whitewashing, fumigating, applying anti-microbial agents to, sweeping, vacuuming, soaking, removing stains and soil marks from, waxing, buffing, utilizing a squeegee device on, applying cleaning solution to, dusting, bleaching, or shampooing a portion of an area.

8. The method of claim 1 wherein the stored map of the area layout is accessed in an internal memory store.

9. The method of claim 1 wherein the stored map of the area layout is accessed in an external memory store.

10. The method of claim 9 wherein the external memory device is a central memory store accessible by a plurality of robot systems.

11. The method of claim 1 wherein the stored map of the area layout is edited, the stored map of the area layout being edited by:
   accessing the stored map of the area layout in a first memory portion;
   editing the stored map of the area layout and making an edited map of the area layout; and
   storing the edited map of the area layout in a second memory portion.

12. The method of claim 11 wherein the stored map of the area layout is edited by amending, adding or deleting a physical feature of the area layout in the stored map.

13. The method of claim 11 wherein the stored map of the area layout is edited by amending, adding or deleting at least one boundary of an area segment of the area layout in the stored map.

14. The method of claim 1 wherein the step of commanding the robot system to perform a function in an area includes sending a command from an operator to the robot system via a communication interface, the communication interface being a wireless communication from the operator to the robot system.

15. The method of claim 1 wherein the step of commanding the robot system to perform a function in an area includes sending a command from an operator to the robot system via a communication interface, the communication interface being a wireless communication from the operator to a communication network linked to the robot system.

16. The method of claim 15 wherein the communication interface is a telephone call from the operator to the robot system.

17. The method of claim 1 further including the step of outputting information from the robot system upon performance of the function in the area.

18. The method of claim 17 wherein the information is a communication representing that the robot system has performed the function in the area.

19. The method of claim 1 further including commanding a plurality of robot systems to perform a function in the area, the plurality of robot systems communicating with each other.

20. The method of claim 19 wherein each of the plurality of robot systems communicates with a central controller.

21. The method of claim 19 wherein the communication between at least two of the plurality of robot systems includes communication relating to respective function tasks of each of the at least two robot systems.

22. A method of utilizing a cleaning robot system to perform a cleaning function, the cleaning function having at least one cleaning function task, comprising the steps of:
   commanding the cleaning robot system to perform the cleaning function in an area the area having an area layout including at least one area segment;
   accessing by the cleaning robot system a stored map of the area layout, the stored map having at least one cleaning function task associated with the at least one area segment;
   localizing a first position of the cleaning robot system in the area;
   determining a cleaning function path by the cleaning robot system from the first position of the cleaning robot system for navigation of the area and completion of the at least one cleaning function task;
   repeatedly continuously localizing a current position of the cleaning robot system while navigating the robot system along the cleaning function path; and
   completing the at least one cleaning function task that is associated with the current position of the cleaning robot system on the stored map of the area.

23. The method of claim 22 wherein the function is edited by adding or deleting at least one function task such that the function has at least one function task.

24. The method of claim 22 wherein the stored map of the area layout is accessed in an external memory store.

25. The method of claim 22 wherein the external memory device is a central memory store accessible by a plurality of robot systems.

26. The method of claim 22 wherein the step of commanding the robot system to perform a function in an area includes sending a command from an operator to the robot system via a communication interface, the communication interface being a wireless communication from the operator to a communication network linked to the robot system.

27. The method of claim 22 further including the step of repeatedly continuously monitoring by the cleaning robot system for obstacles in the cleaning function path.

28. The method of claim 27 further including the step of updating the cleaning function path upon the detection of an obstacle in function path.

29. A method of utilizing a cleaning robot system to perform a cleaning function, the cleaning function having at least one cleaning function task, comprising the steps of:
   commanding the cleaning robot system to perform the cleaning function in an area, the area having an area layout including at least one area segment;
   accessing by the cleaning robot system a stored map of the area, the stored map having at least one cleaning function task associated the at least one area segment;
   localizing a first position of the cleaning robot system in the area;
   associating the first position of the cleaning robot system with a first mapped position on the stored map;
   determining a cleaning function path by the cleaning robot system for navigation of the area and completion of the at least one cleaning function task associated with the at least one area segment;
   navigating the cleaning robot system along the cleaning function path; and
   completing the at least one cleaning function task associated with the at least one area segment.

30. A method of mapping an area utilizing a robot system, comprising the steps of:
   commanding the robot system to map an area, the area having an area layout including at least one area segment;
   determining the area layout by the robot system, the robot system utilizing sensors to acquire area layout information representing the area layout;
   producing a map of the area layout based on the area layout information acquired by the robot system; and
   storing the map of the area layout in a first memory device.

31. The method of claim 30 wherein the step of determining the area layout by the robot system, the robot system utilizing sensors to acquire area layout information representing the area layout further includes the step of navigating the robot system on a recording path transversing the at least one area segment.

32. The method of claim 30 further including the steps of accessing the map of the area layout stored in the first memory device;

editing the map of the area layout stored in the first memory device to produce an edited map of the area layout; and storing the edited map of the area layout in a second memory device.

33. The method of claim 30 further including the step of associating at least one function task with the at least one area segment.

34. A robot system for performing a function in an area, the area having an area layout including at least one area segment, the robot system comprising:

a processor portion for processing data in the robot system;

an interaction portion, the interaction portion receiving a command to perform a function in the area, the processor portion controlling the interaction portion;

a memory portion containing at least one map data file associated with the function, the at least one map data file including area layout data, the memory portion further containing at least one task data file associated with the function, the at least one task data file including task data for use by the processor portion in completing the at least one function task, the processor portion accessing the at least one map data file and the at least one task data file;

a sensor system including a plurality of sensors in communication with the processor portion, the plurality of sensors inputting information relating to the area layout to the processor portion, the sensor system localizing a first position of the robot system in the area layout and communicating the first position to the processor portion;

a path portion, the path portion determining a function path for navigation of the area and completion of the at least one function task associated with the function, the path portion reporting the function path to the processor portion;

a transport portion for navigating the robot system from the first position of the robot system in the area along the function path, the processor portion directing the transport portion to move the robot system from the first position of the robot system along the function path; and a task portion, the task portion completing the at least one function task associated with the function while the robot system moves along the function path, the task portion being controlled by the processor portion.

35. The system of claim 34 wherein the task portion is a cleaning portion.

36. The system of claim 35 wherein the cleaning portion includes at least one cleaning device selected from the group consisting of a solution container, applicator nozzles, a cleaning brush, a vacuum device, a squeegee device, a waxing device, a dryer device, a mopping device, a floor buffer device, a rinsing device, a wringing device, a flushing device, a wiping device, a dust mopping device, a sponging device, a scouring device, an abrasive applicator device, a grinding device, a leveling device, a swabbing device, a scrubber device, a scraper device, a stripping device, a sander device, a laundering device, a detergent applicator device, a disinfectant applicator device, an irradiating device, a deodorizer applicator device, a fumigation device, an anti-microbial agent applicator device, a sweeping device, a stain removal device, a bleaching device, or a shampooing device.

37. The system of claim 34 wherein the sensor system includes at least one sonar sensor.

38. The system of claim 34 wherein the sensor system includes at least one laser sensor.

* * * * *